US005644435A

United States Patent [19]
Shikama

[11] Patent Number: 5,644,435
[45] Date of Patent: Jul. 1, 1997

[54] ZOOM LENS SYSTEM AND PROJECTION-TYPE DISPLAY APPARATUS

[75] Inventor: Shinsuke Shikama, Tokyo, Japan

[73] Assignee: Mitsubishi Denki Kabushiki Kaisha, Tokyo, Japan

[21] Appl. No.: 567,495

[22] Filed: Dec. 5, 1995

[30] Foreign Application Priority Data

Jan. 19, 1995 [JP] Japan ................. 6427/95

[51] Int. Cl.⁶ .................. G02B 15/14; G02B 9/00; G02B 13/16; H04N 9/07
[52] U.S. Cl. .................. 359/691; 359/740; 359/649; 348/335
[58] Field of Search .................. 359/691, 686, 359/740, 649; 348/335, 336

[56] References Cited

U.S. PATENT DOCUMENTS

| | | | |
|---|---|---|---|
| 3,771,853 | 11/1973 | Nakamura | 359/686 |
| 4,662,723 | 5/1987 | Imai | 359/691 |
| 4,775,228 | 10/1988 | Ikemori et al. | 359/691 |
| 5,179,473 | 1/1993 | Yano et al. | 359/691 |
| 5,319,495 | 6/1994 | Yamada | 359/691 |
| 5,329,401 | 7/1994 | Sato | 359/691 |
| 5,329,402 | 7/1994 | Sato | 359/691 |
| 5,339,195 | 8/1994 | Ogata | 359/691 |
| 5,418,648 | 5/1995 | Ono | 359/686 |

FOREIGN PATENT DOCUMENTS

| | | | |
|---|---|---|---|
| 52-134452 | 8/1977 | Japan . | |
| 0072066 | 6/1979 | Japan | 359/691 |
| 4-83215 | 6/1992 | Japan . | |
| 5-119257 | 8/1993 | Japan . | |

*Primary Examiner*—Georgia Y. Epps
*Assistant Examiner*—Evelyn A. Lester

[57] ABSTRACT

A zoom lens system comprising, in order from a large conjugate side a first lens group having a negative refracting power and a second lens group having a positive refracting power. A focal length of the zoom lens system becomes longer, as a gap between the first lens group and the second lens group is reduced. The zoom lens system satisfies following relational expressions (1) to (4), $$0.9 < |f_1|/f_w < 1.2 \quad (1)$$

$$0.8 < f_2/f_w < 1.2 \quad (2)$$

$$0.3 < D_{12w}/f_w < 0.5 \quad (3)$$

$$BF_w/f_w > 1.5 \quad (4)$$

where a symbol $f_1$ designates a focal length of the first lens group, a symbol $f_2$ designates a focal length of the second lens group, a symbol $f_w$ designates a focal length of the zoom lens system at a minimum focal length state, a symbol $D_{12w}$ designates the gap between the first lens group and the second lens group at the minimum focal length state, and a symbol $BF_w$ designates a back focal length at the minimum focal length state.

19 Claims, 24 Drawing Sheets

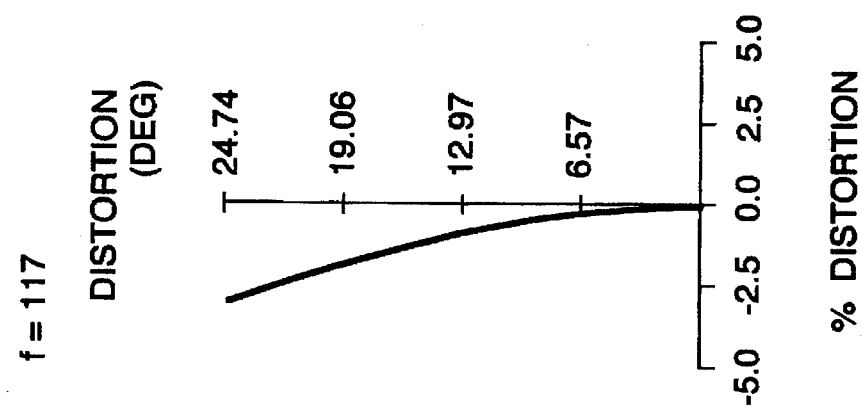
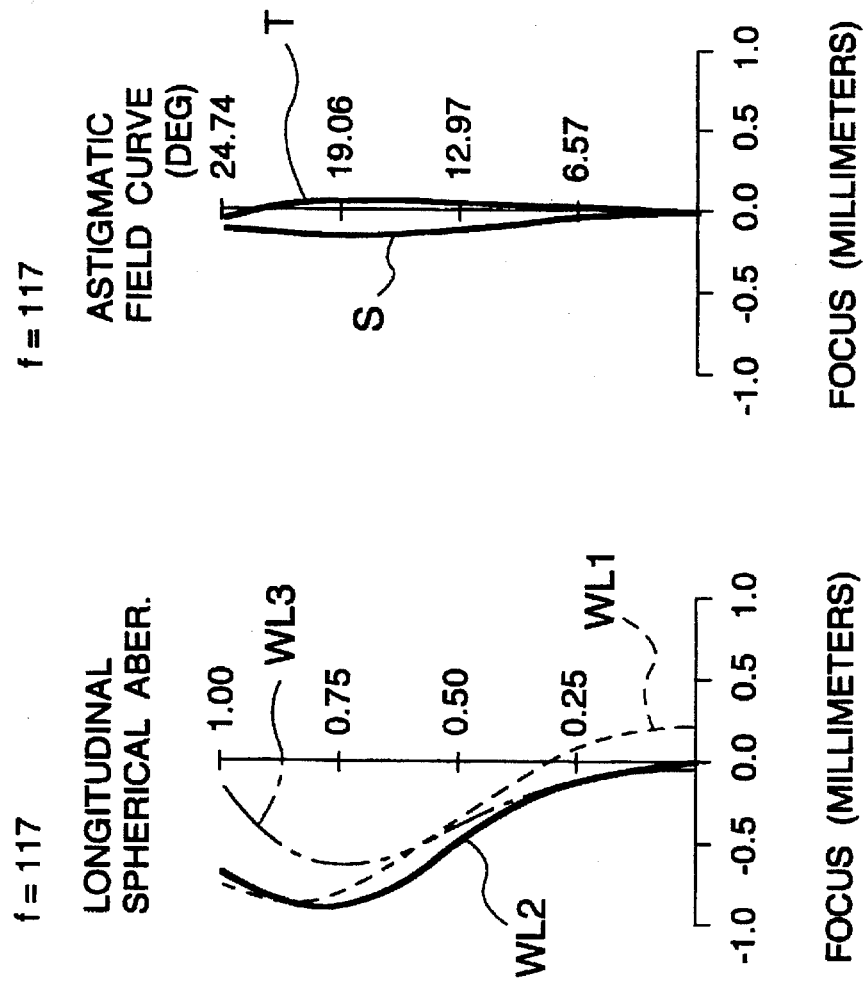

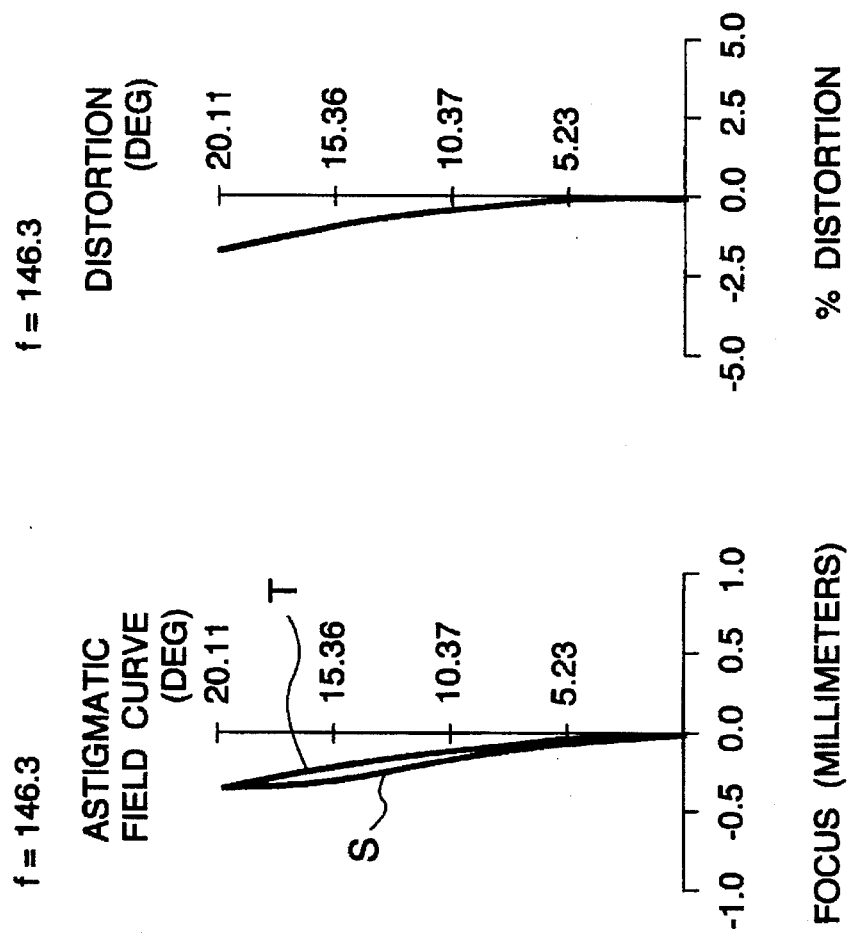

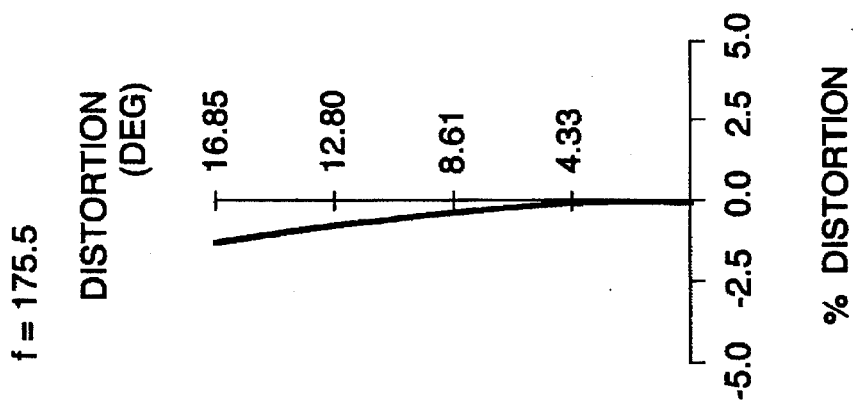
FIG. 5C
FIG. 5B
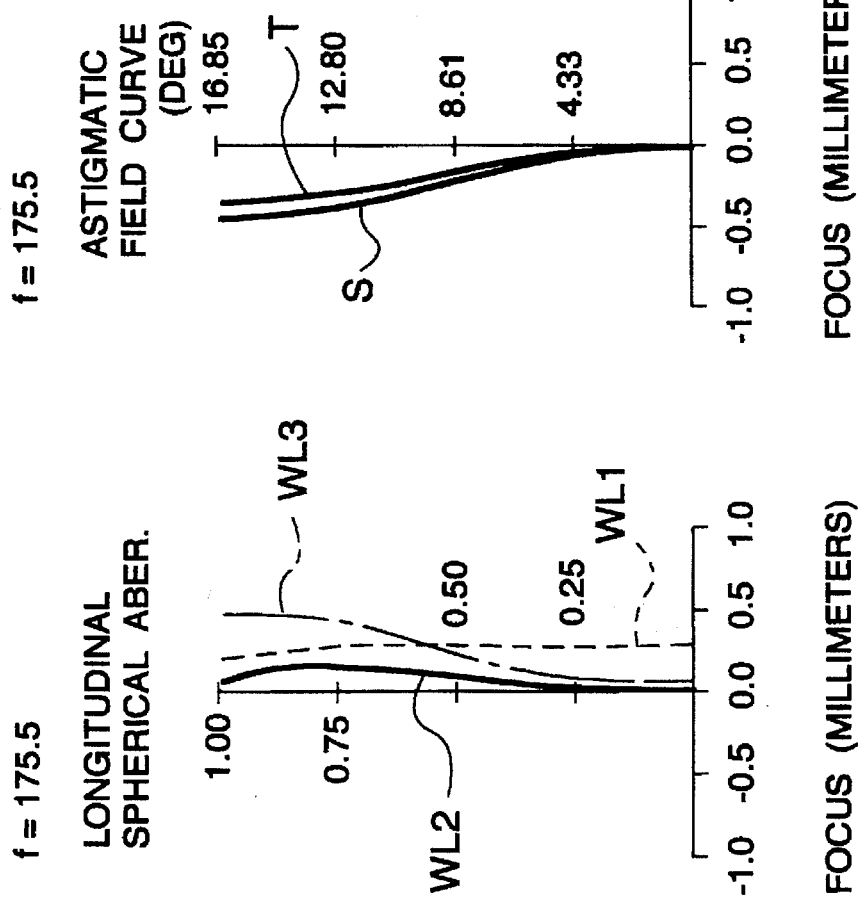
FIG. 5A

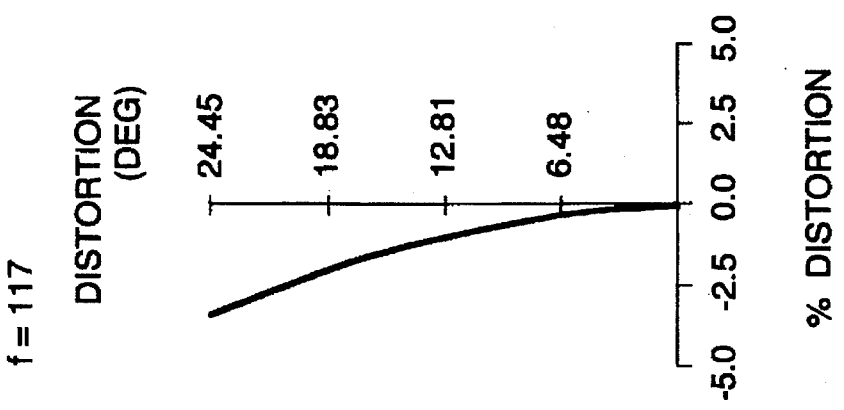
FIG. 6C
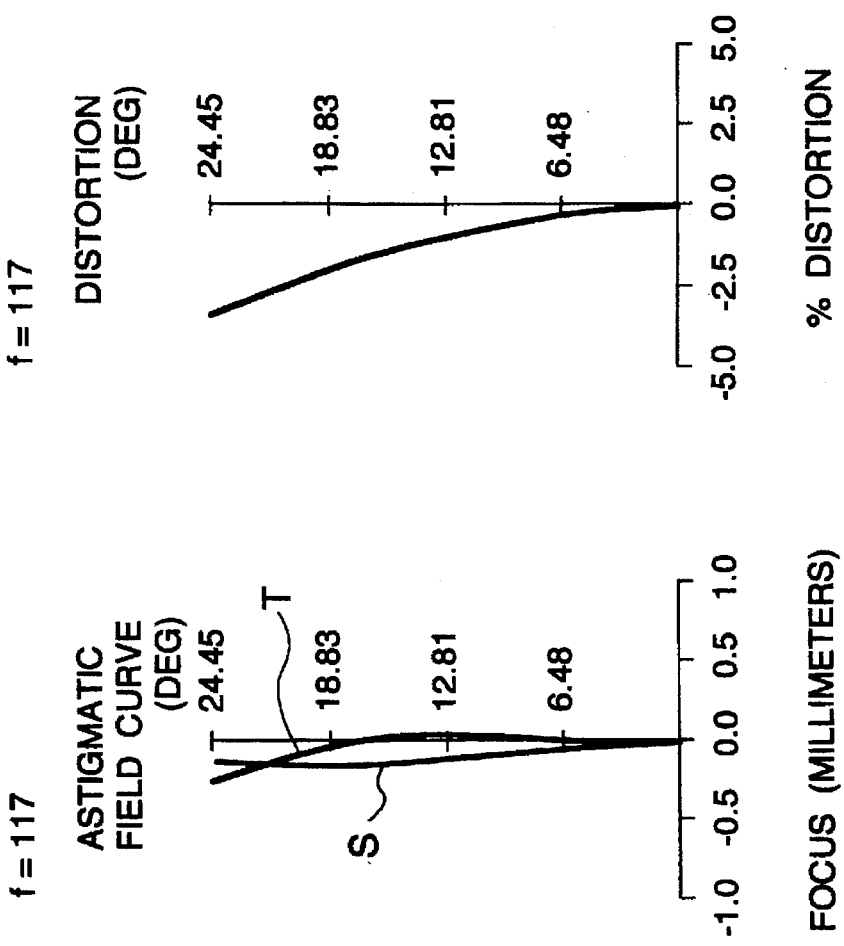
FIG. 6B
FIG. 6A

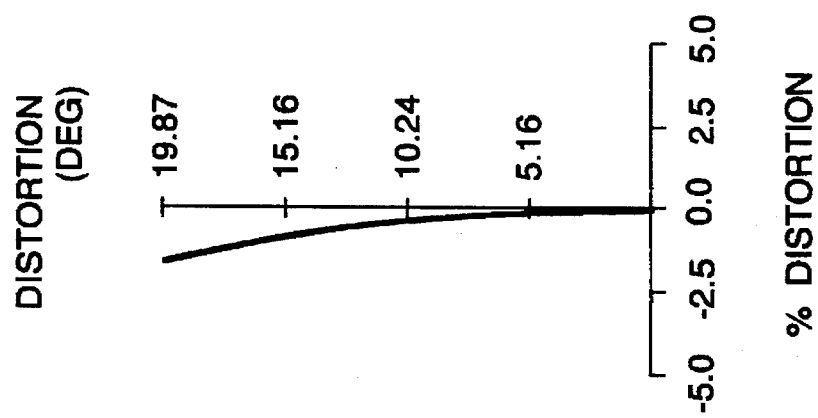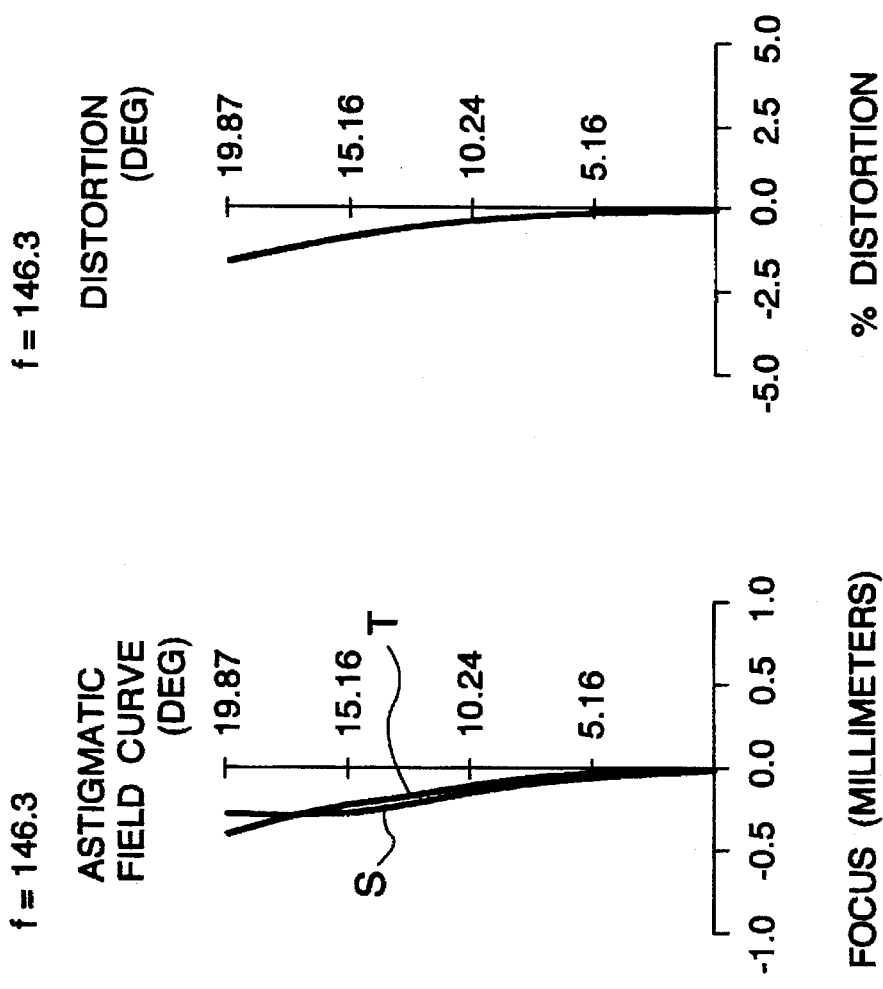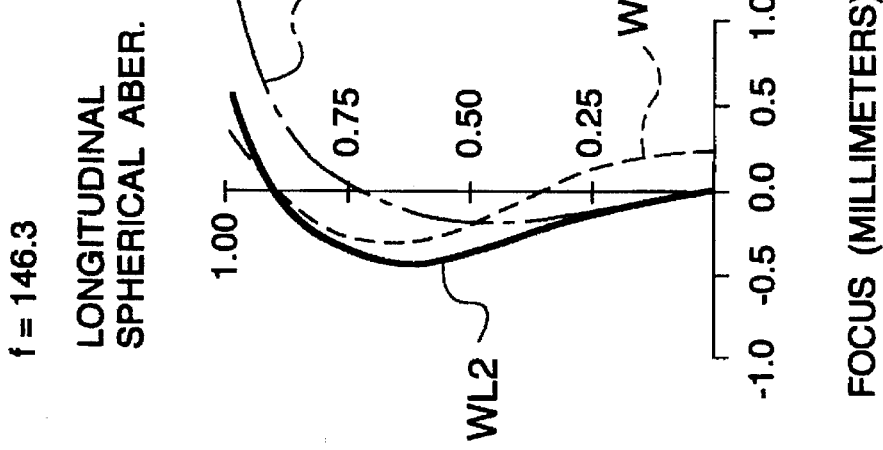

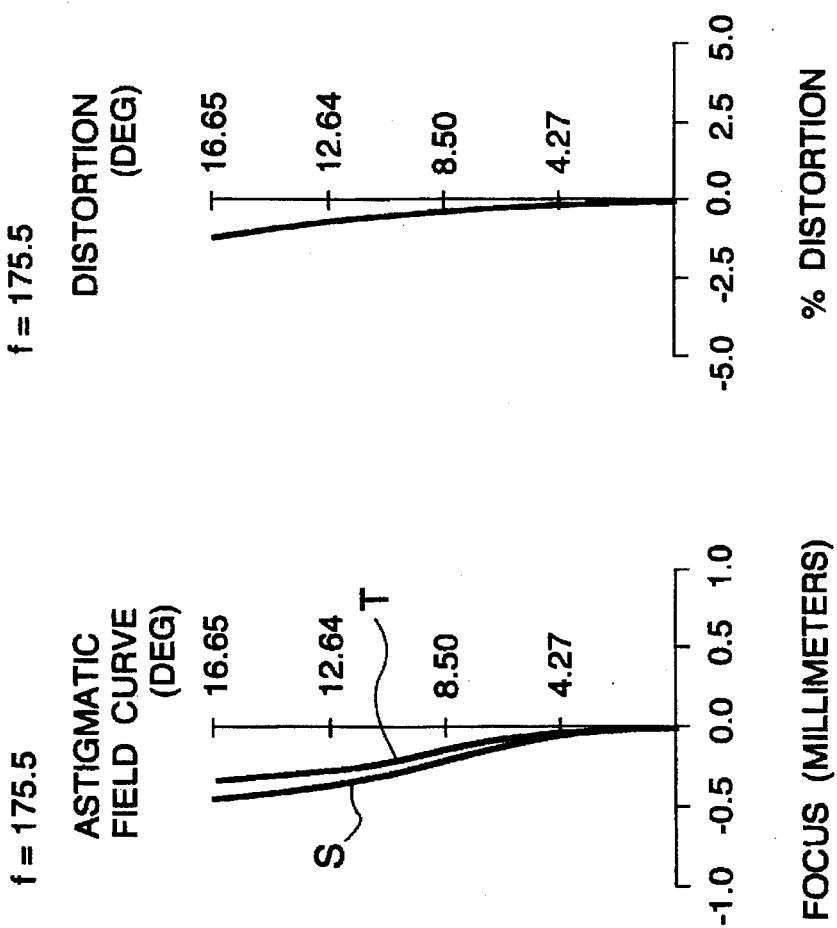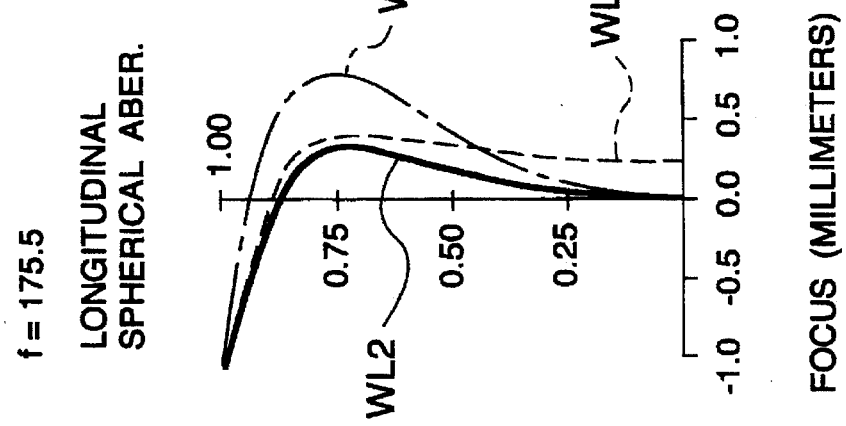

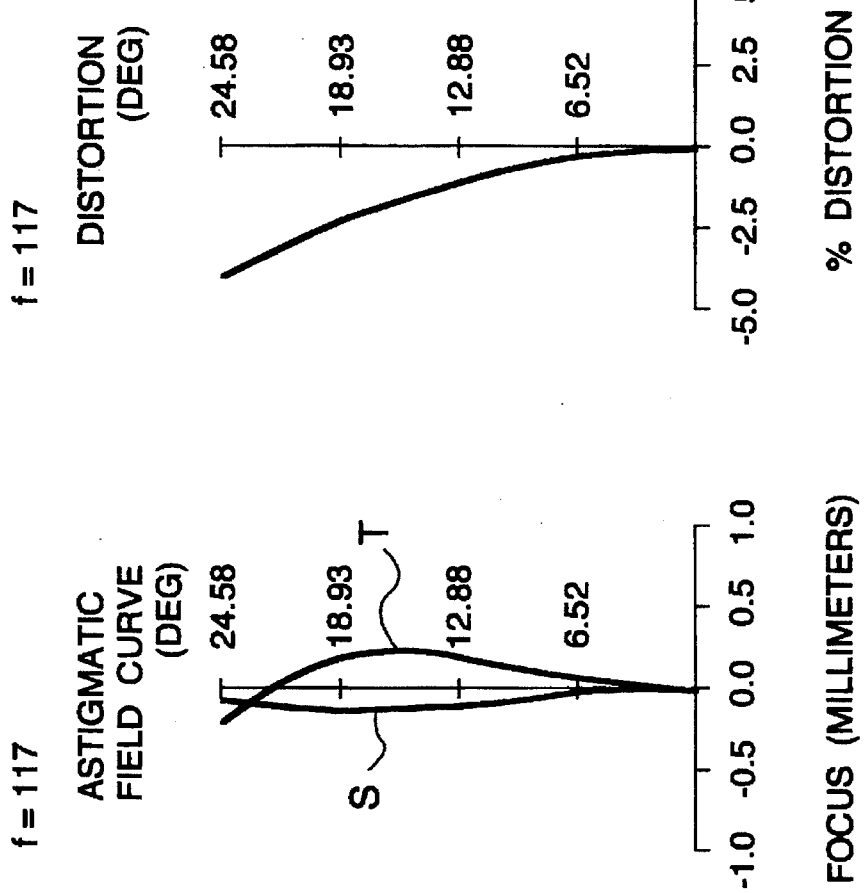
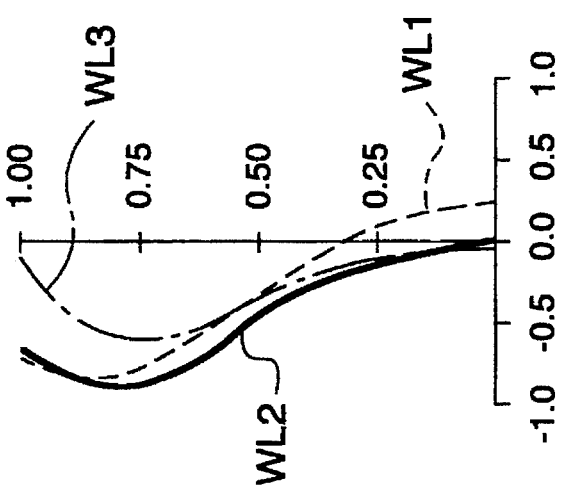

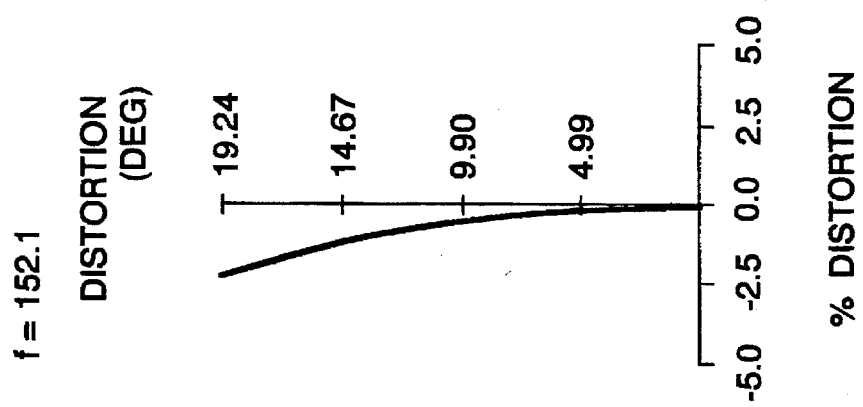
FIG. 10C
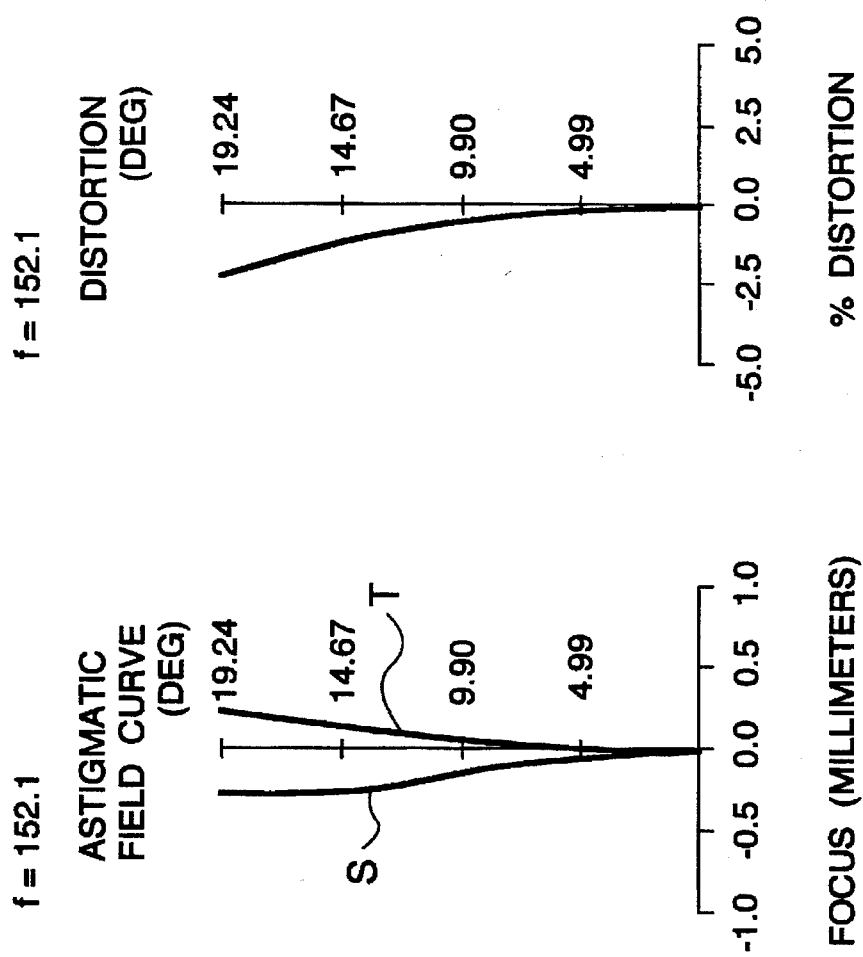
FIG. 10B
FIG. 10A

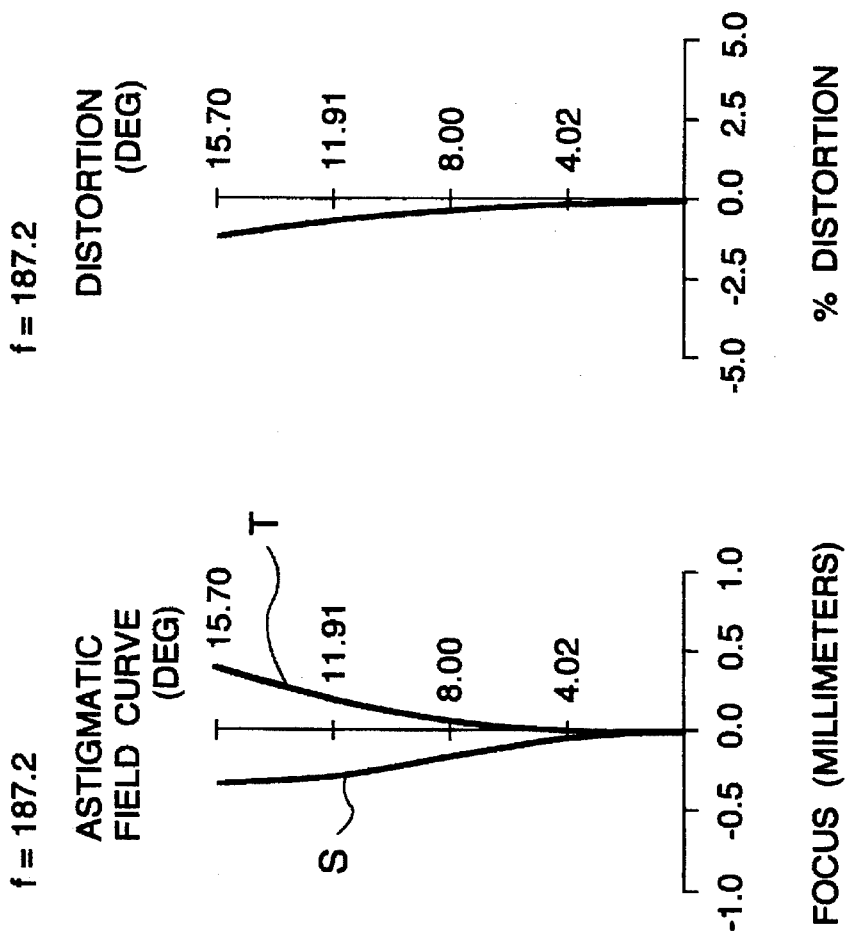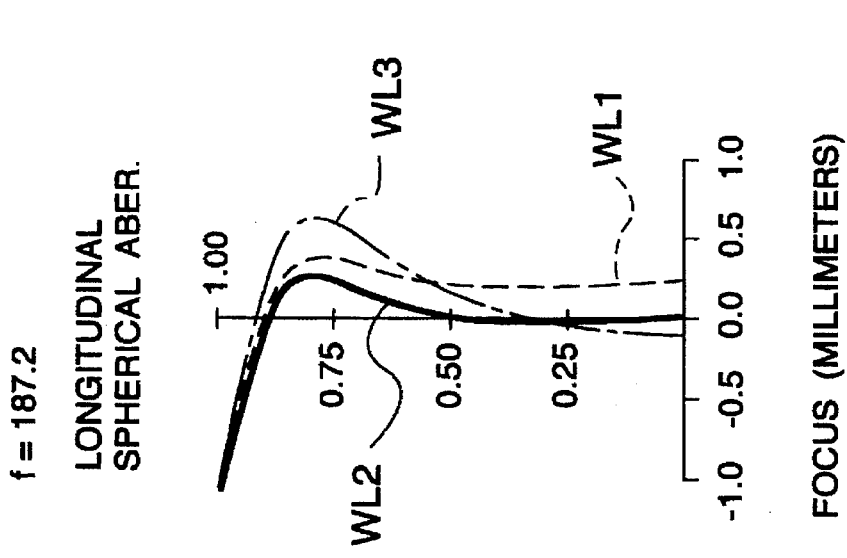

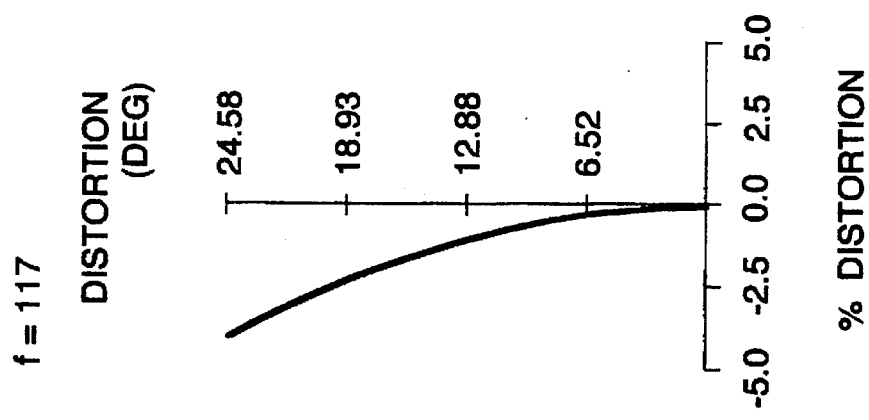
FIG. 12C
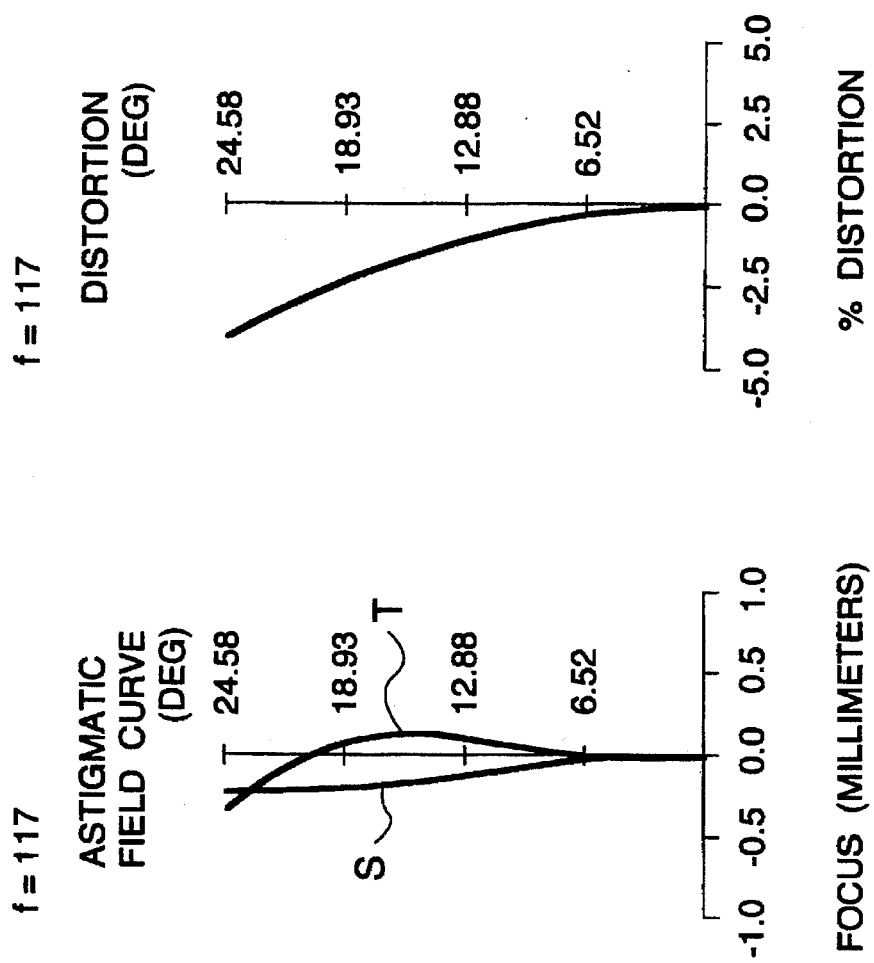
FIG. 12B
FIG. 12A
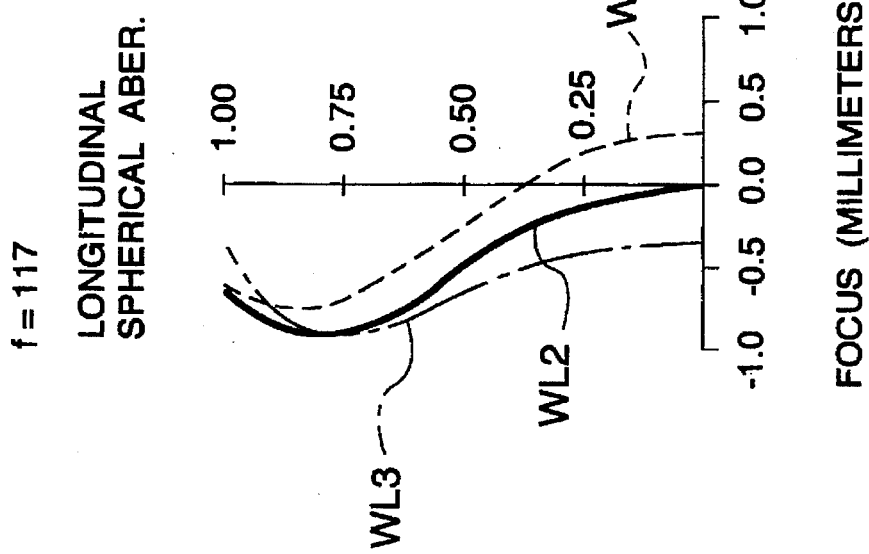

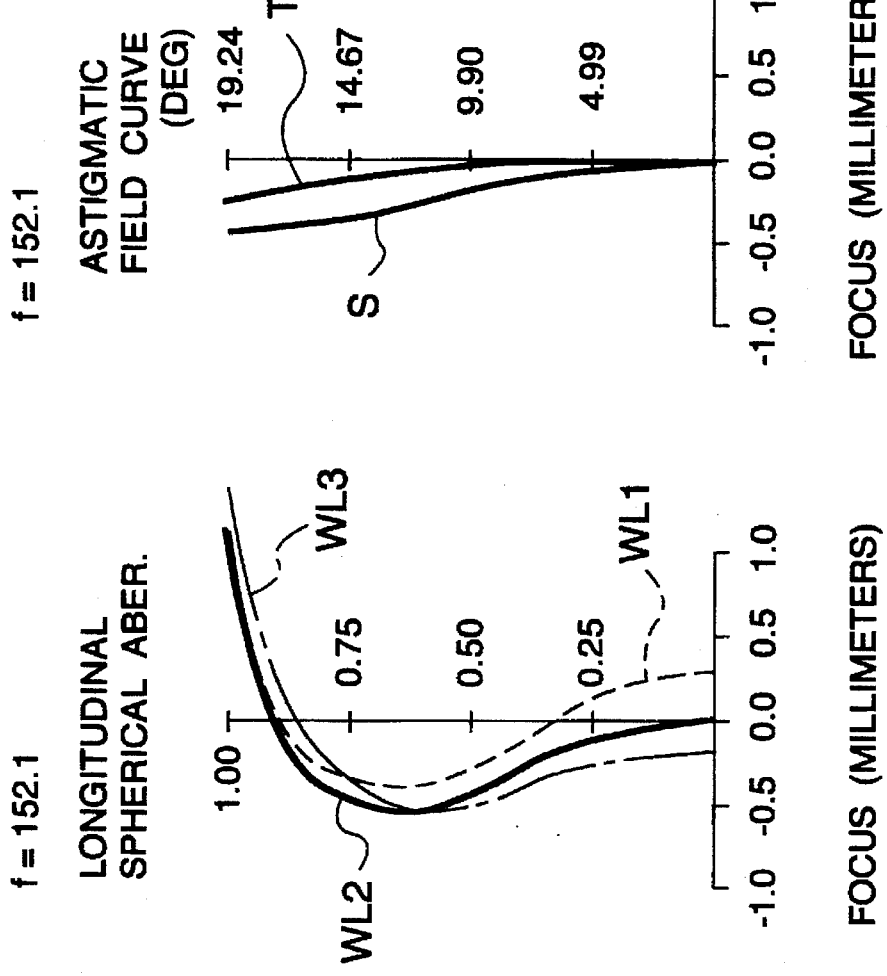

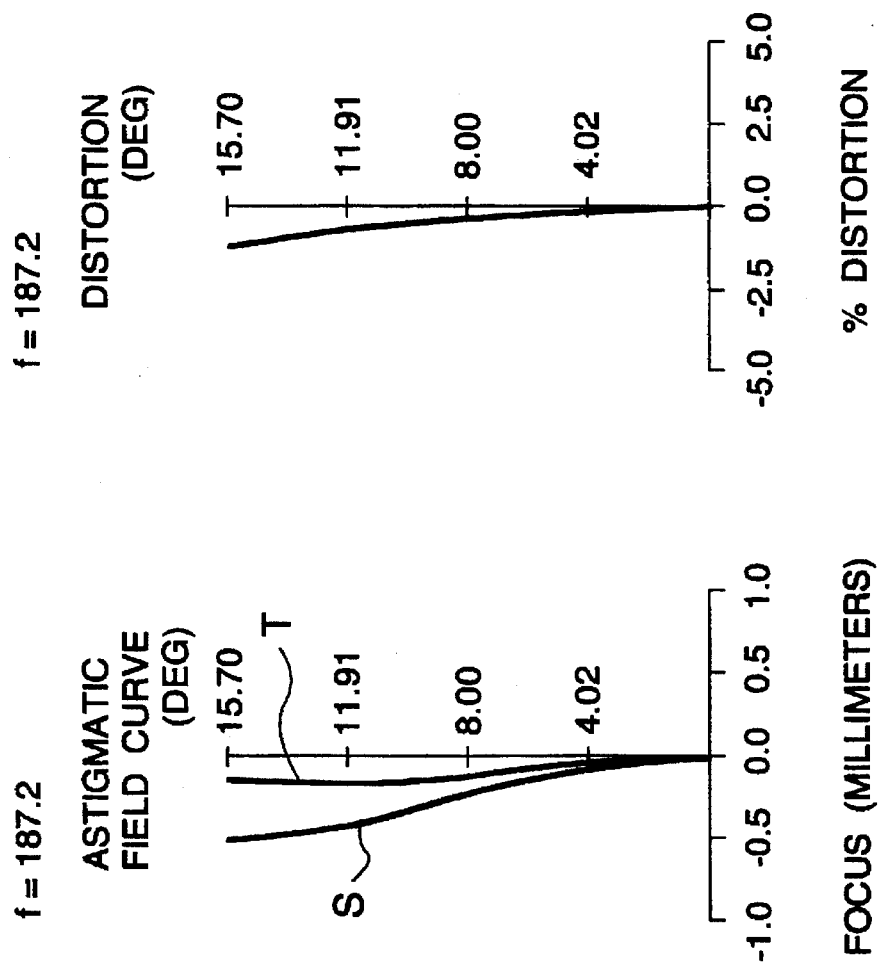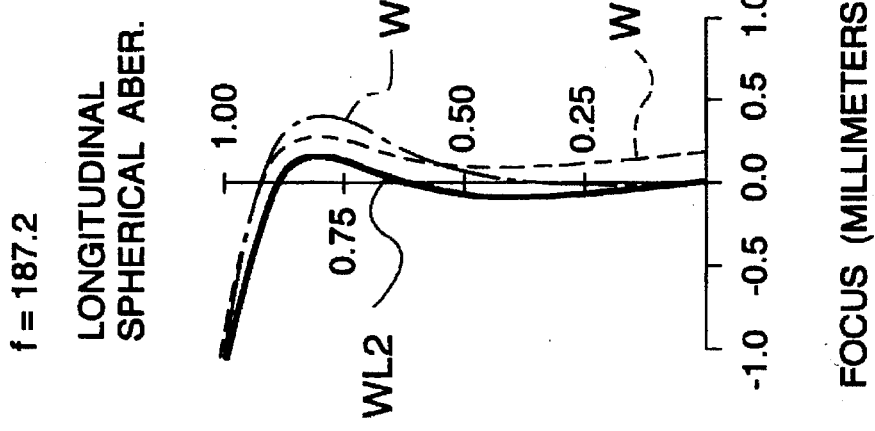

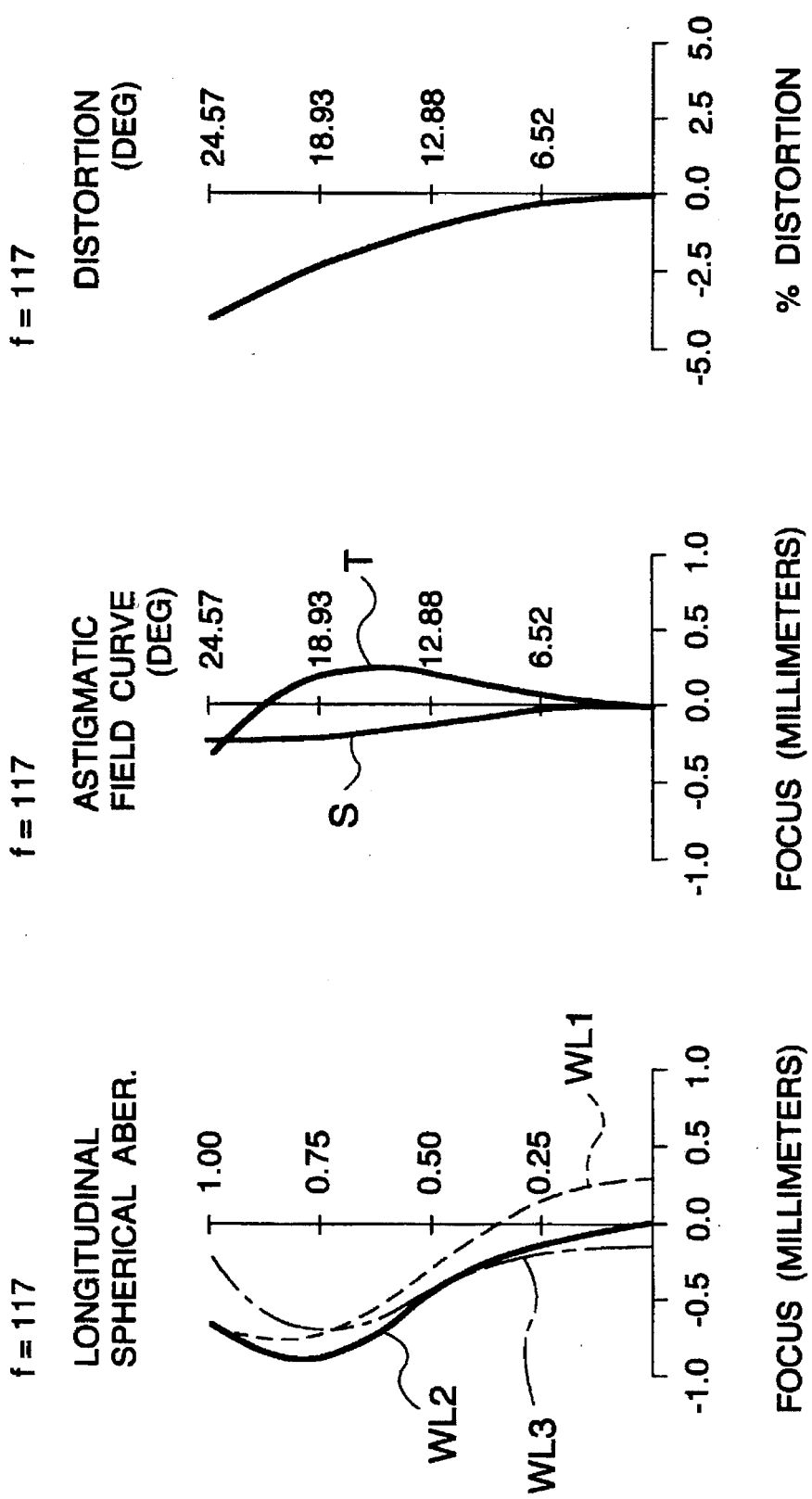

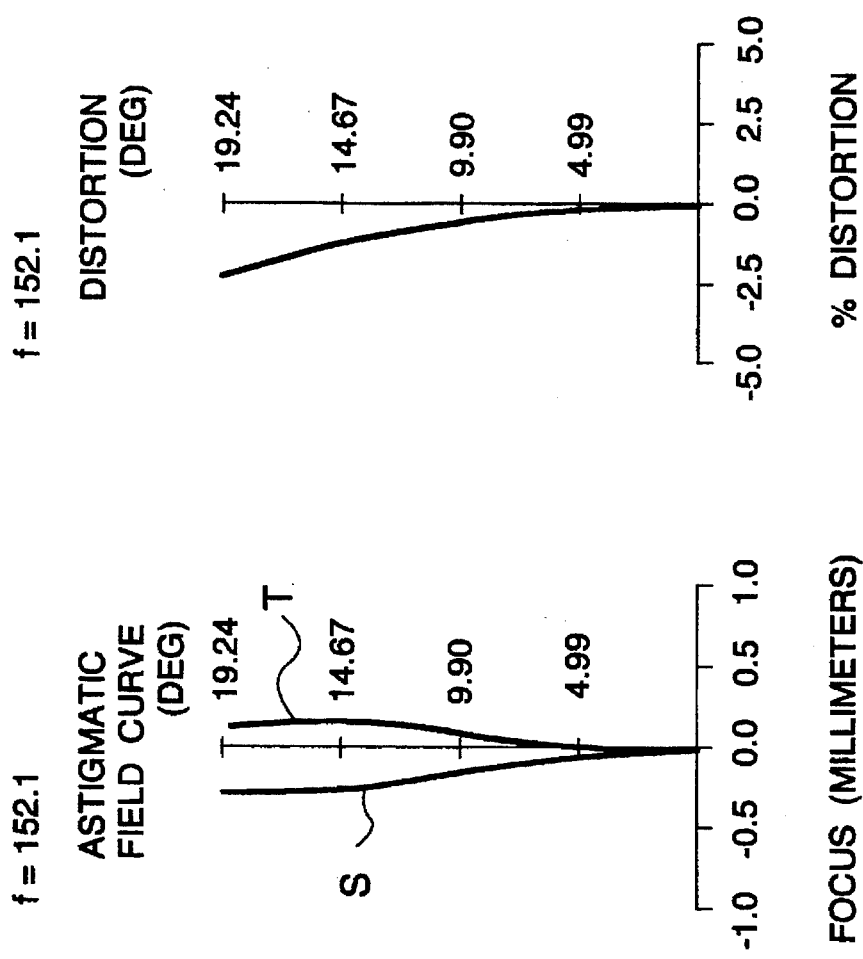

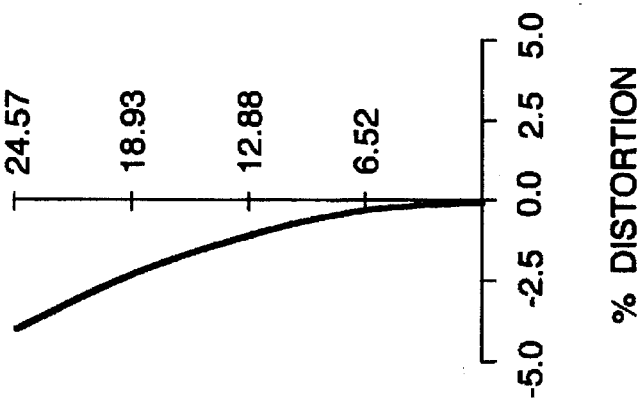
FIG. 18C  FIG. 18B  FIG. 18A
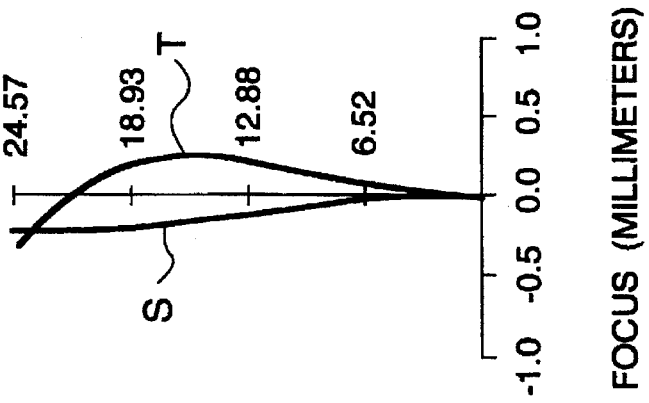
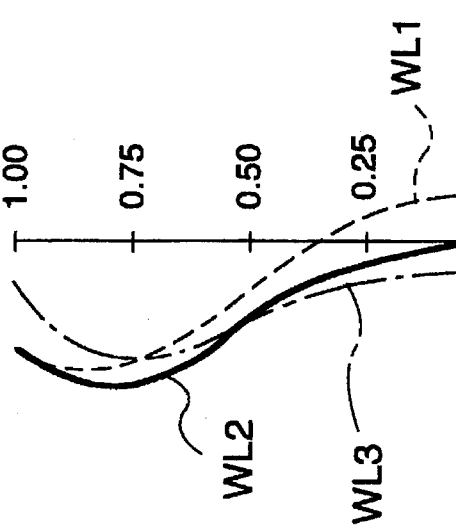

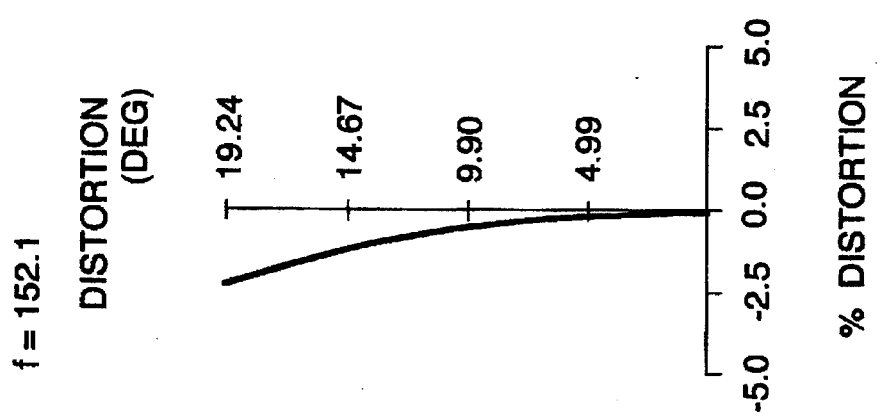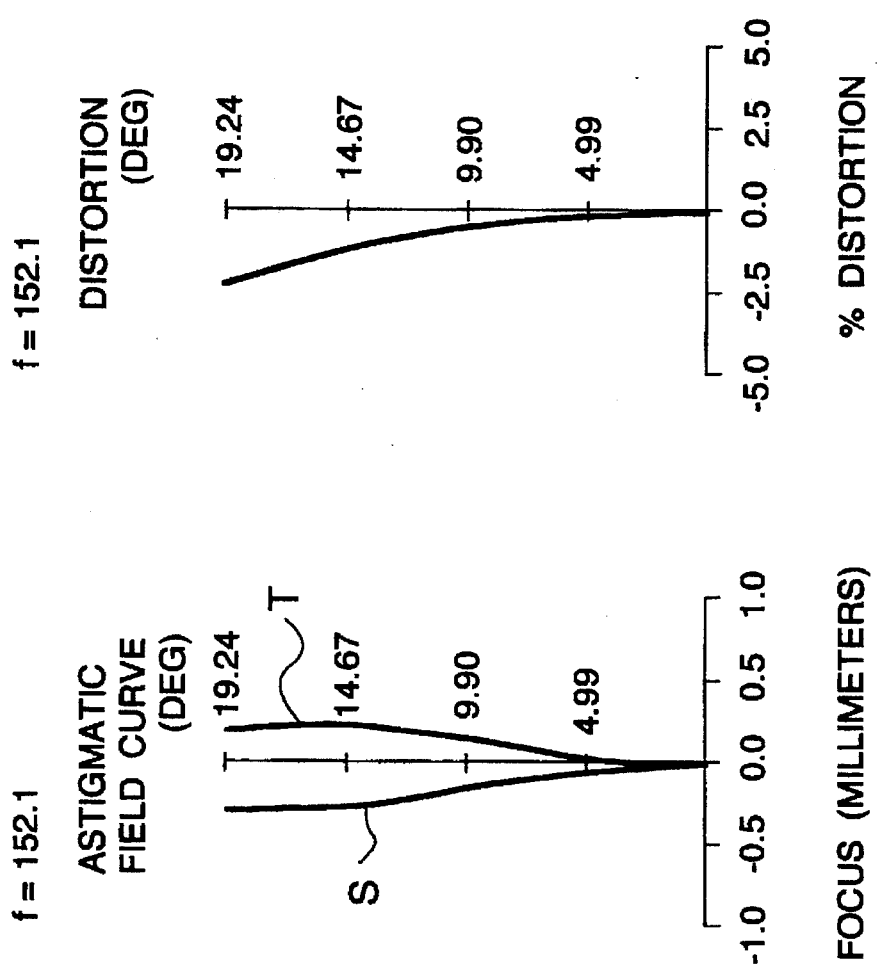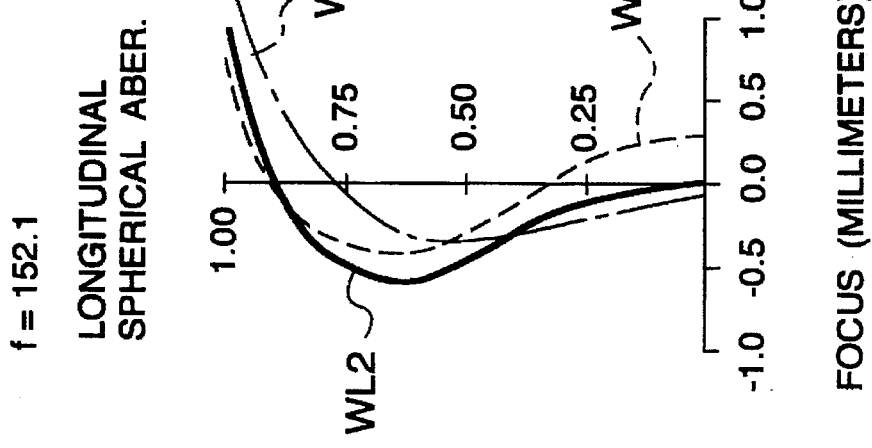

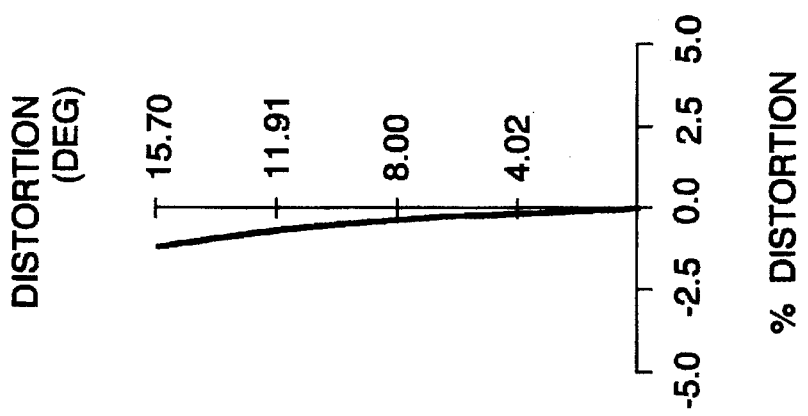
FIG. 20C
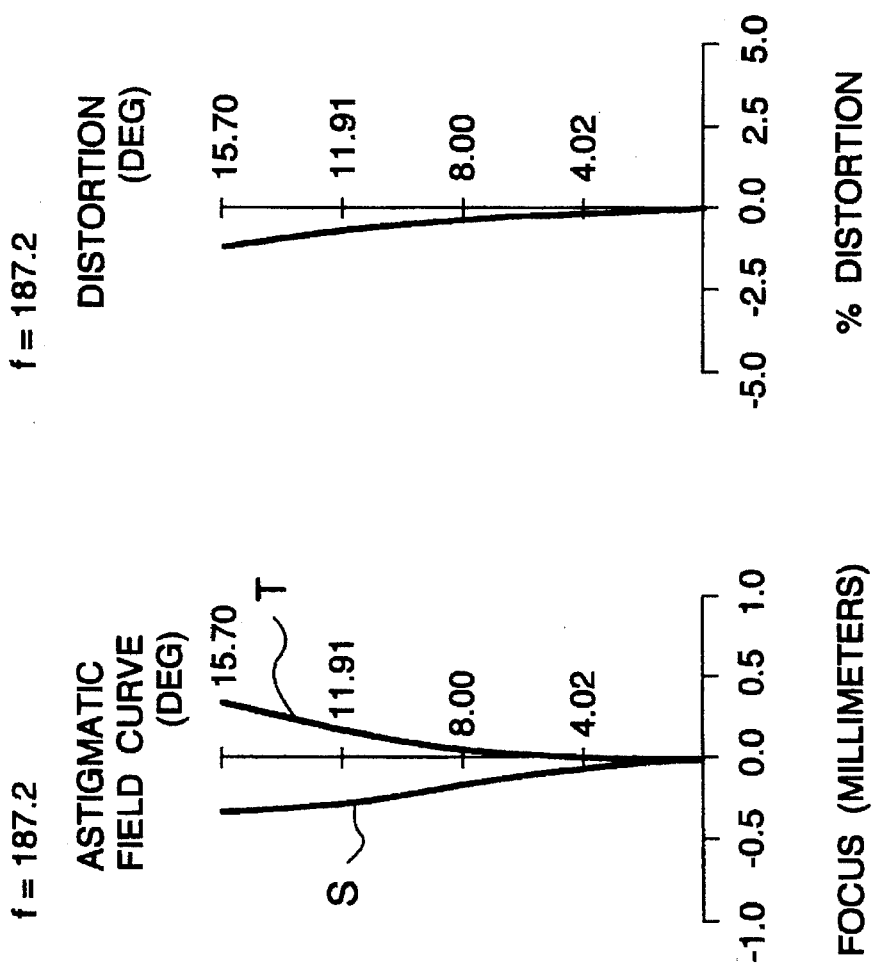
FIG. 20B
FIG. 20A

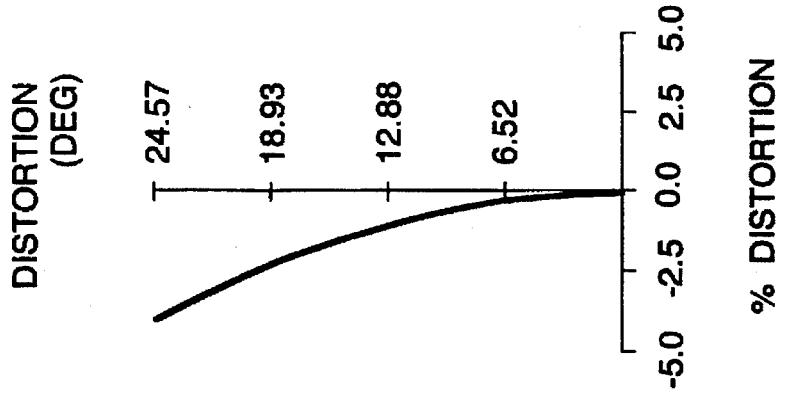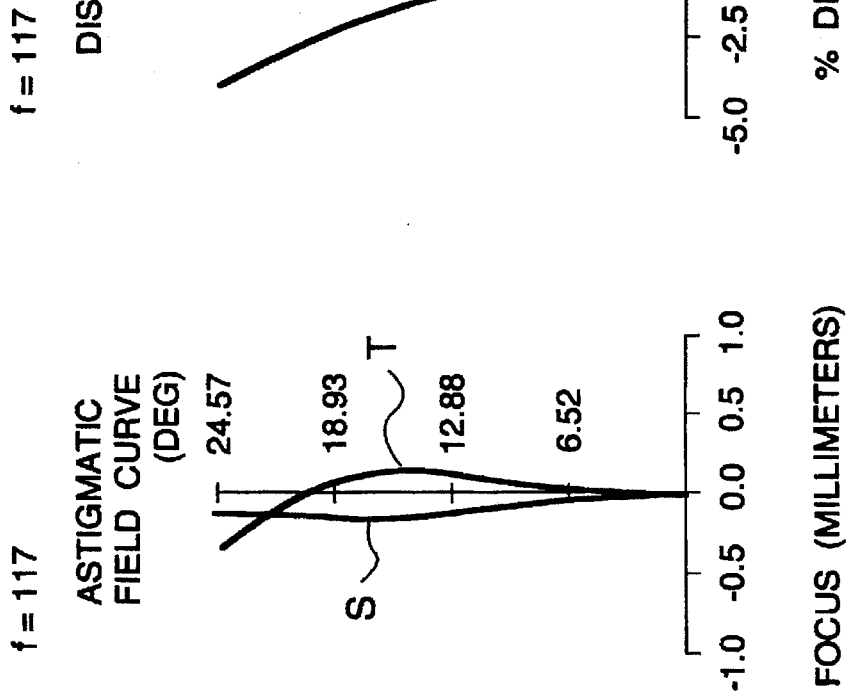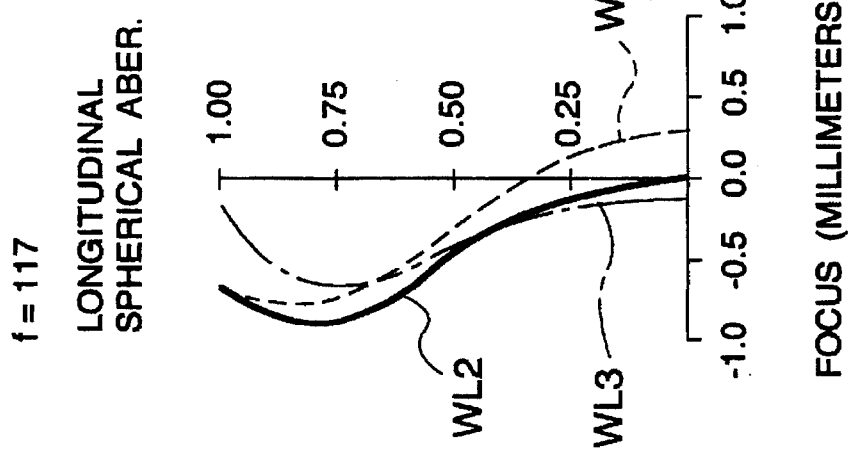

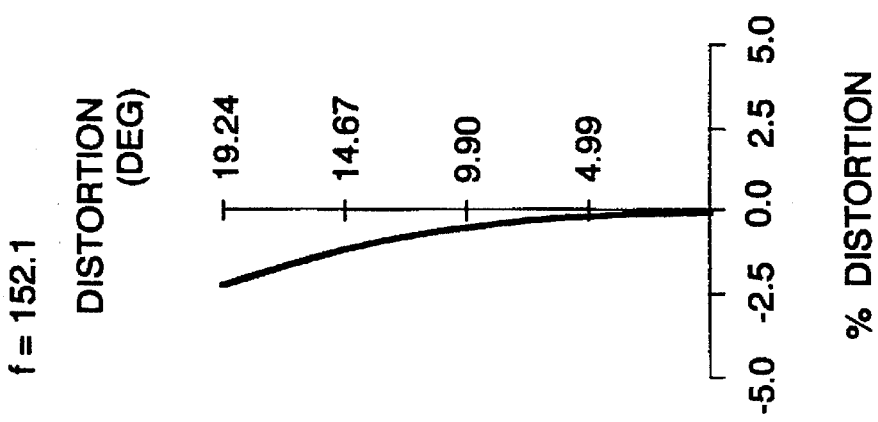
FIG. 22C
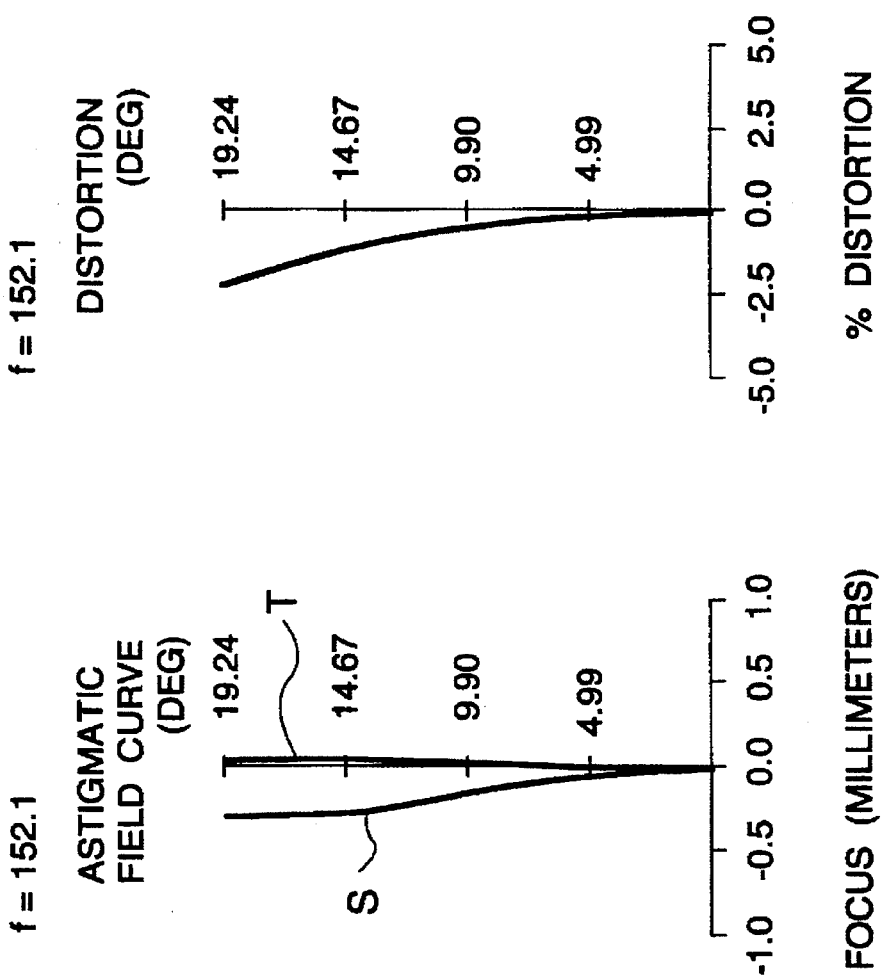
FIG. 22B
FIG. 22A

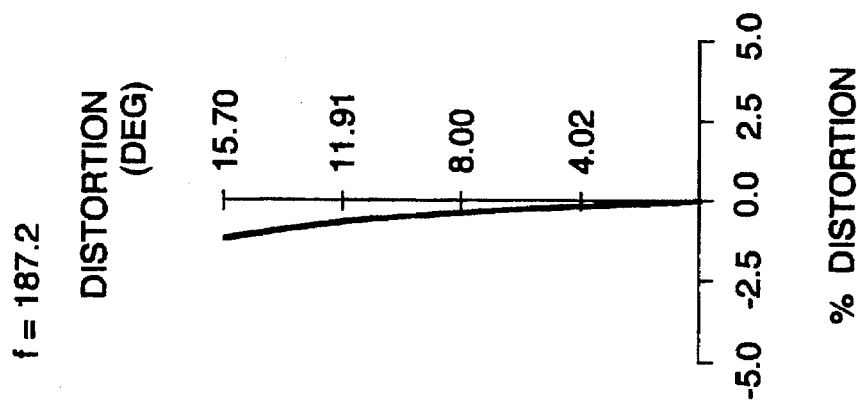
FIG. 23C
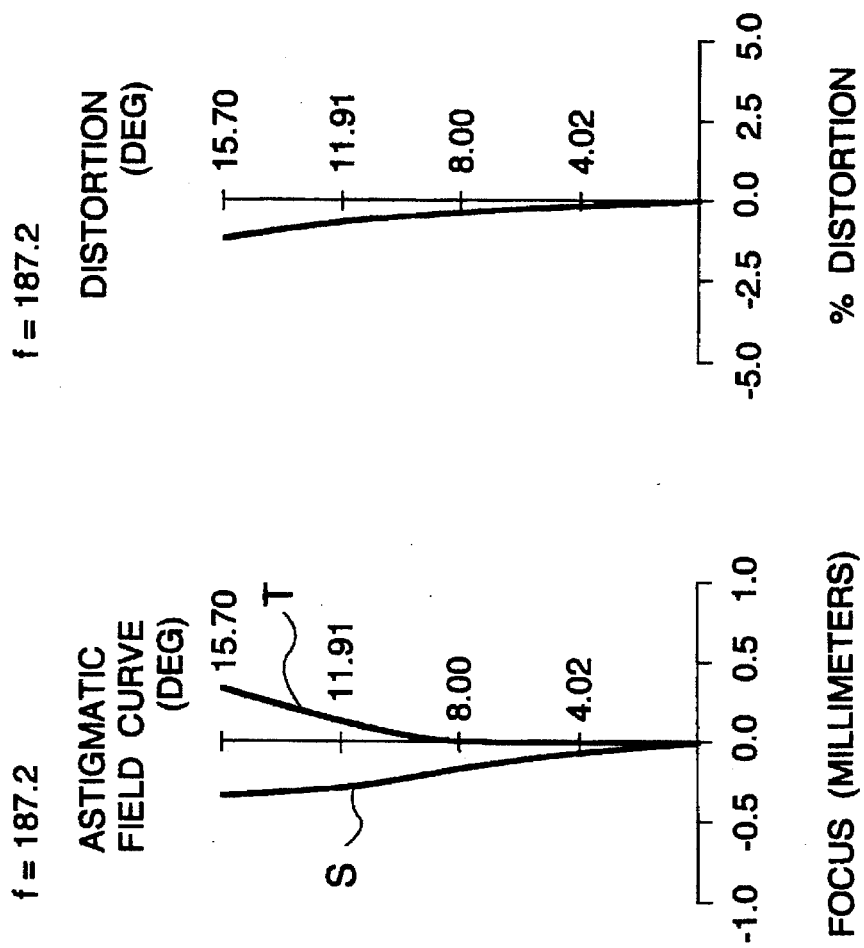
FIG. 23B
FIG. 23A

ZOOM LENS SYSTEM AND PROJECTION-TYPE DISPLAY APPARATUS

BACKGROUND OF THE INVENTION

The present invention relates to a zoom lens system suitable for a projection lens in a liquid-crystal projector that magnifies and projects an image displayed on a liquid-crystal panel onto a screen, and to a projection-type display apparatus incorporating the zoom lens system.

FIG. 24 is a structural diagram showing an optical system of a conventional liquid-crystal projector as a projection-type display apparatus. In FIG. 24, a reference numeral 11 designates a light source such as a metal halide lamp or a xenon lamp, 12 designates an elliptical mirror, 13 designates a reflecting mirror and 14 designates a collimator lens. Further, 2GR, 2G, 70G and 70GB designate dichroic mirrors, 3 and 4 designate reflecting mirrors, 6R, 6G and 6B designate liquid-crystal panels, 21R, 21G and 21B designate condenser lenses, 8 designates a projection lens and SC designates a screen.

A light emitted from the light source 11 is reflected and condensed by the elliptical mirror 12, reflected by the reflecting mirror 13 and impinges on the collimator lens 14, which converts it into parallel light beam 15. The light beam 15 is separated into three primary colors red, green and blue by means of the dichroic mirror 2GR, which reflects green light and red light but transmits blue light, and the dichroic mirror 2G, which reflects green light but transmits red light. Each of the light beams of three primary colors then passes through the respective condenser lenses 21R, 21G and 21B, and impinges on the respective liquid-crystal panels 6R, 6G and 6B. The liquid-crystal panels 6R, 6G and 6B are driven by a drive circuit, which is not shown in the drawings, and each displays a monochromic image of one of three primary colors, red, green and blue, respectively.

The light beams modulated by the images formed on the liquid-crystal panels 6R, 6G and 6B are synthesized into a single light beam by the dichroic mirrors 70G and 70GB, and the synthesized light beam is converted by the projection lens 8 into projection light 9, so that a magnified color image is projected onto the screen SC.

The condenser lenses 21R, 21G and 21B are provided for the purpose of converting the parallel light beam 15 into a convergent light beam, and injecting the synthesized light beam 15 efficiently into the projection lens 8. The projection lens 8 is a zoom lens wherein the focal length is changed, thereby changing the size of the image projected onto the screen SC. Furthermore, focusing of the light projected on the screen SC is also accomplished by moving a portion of the lens group included in the projection lens 8 or the whole projection lens 8 in the direction of the optical axis.

The zoom lens system for a liquid-crystal projector in which primary color images on three liquid-crystal panels are synthesized by two dichroic mirrors is subject to the following requirements (a) to (e):

(a) The zoom lens system must have a back focal length great enough for the color synthesizing dichroic mirrors and reflecting mirrors to be inserted.

(b) The focal length of the zoom lens system at the minimum focal length state must be short enough and the field angle of the projection light must be large enough to form a large picture image at a short projection distance, and the zoom ratio must be large enough.

(c) The resolving power must be high enough for projecting the image from the liquid-crystal panels of high pixel density, and distortion and chromatic aberration must be well controlled.

(d) The number of constituent lens must be small, the overall length of the zoom lens system must be short, and the diameter of the zoom lens system must be small. Also, the structure of the lens barrel must be simple.

(e) In the case that the transmission scattering-type liquid crystals such as polymer dispersed liquid crystal (PDLC) is used, it is desirable that an aperture stop for removing scattered light is provided in the zoom lens system, and the diameter of the aperture stop is variable for adjusting the scattered light removal characteristics.

The zoom lens system including two lens groups suitable for a photographic lens, in which the back focal length is greater than the focal length, is disclosed in Japanese Patent Kokai Publication No. 134452/1977. In this publication, a first lens group has a negative refracting power and a second lens group has a positive refracting power. If it is attempted, however, to make use of a photographic lens in a liquid-crystal projector, such a lens may not be of the ideal structure in terms of field angle, F number, back focal length, number of lens included in the zoom lens system, and so on.

Further, examples of conventional zoom lens systems for use in a liquid-crystal projector, of the type in which light beams from three liquid-crystal panels are synthesized by two dichroic mirrors, are disclosed in Japanese Patent Kokai Publication Nos. 83215/1992 and 119257/1993. The former comprises four lens groups including eleven lens elements and has a lens barrel of complex structure, and because of the large number of constituent lens elements, the manufacturing cost is high. The latter can, despite its two-group composition, provide a back focal length almost double the focal length at the minimum focal length state, but it has no fewer than twelve or thirteen constituent lens elements and the zoom ratio is small, for example, only 1.2.

SUMMARY OF THE INVENTION

It is an object of the present invention to provide a zoom lens system including two lens groups that consists of eight or nine lenses and that has an F number of 4.5 or more, a half field angle at the minimum focal length state of approximately 24° to 25°, a back focal length 1.5 times or more greater than the focal length at the minimum focal length state, and a zoom ratio of 1.5 to 1.6, thereby satisfying the above described requirements (a) to (e).

According to the present invention, a zoom lens system comprises, in order from a large conjugate side, a first lens group having a negative refracting power, and a second lens group having a positive refracting power. A focal length of the zoom lens system becomes longer, as a gap between the first lens group and the second lens group is reduced. The zoom lens system satisfies following relational expressions (1) to (4), $$0.9 < |f_1|/f_w < 1.2 \quad (1)$$

$$0.8 < f_2/f_w < 1.2 \quad (2)$$

$$0.3 < D_{12w}/f_w < 0.5 \quad (3)$$

$$BF_w/f_w > 1.5 \quad (4)$$

where a symbol $f_1$ designates a focal length of the first lens group, a symbol $f_2$ designates a focal length of the second lens group, a symbol $f_w$ designates a focal length of the zoom lens system at a minimum focal length slate, a symbol $D_{12w}$ designates the gap between the first lens group and the second lens group at the minimum focal length state, and $BF_w$ designates a back focal length at the minimum focal length state.

The second lens group may comprise, in order from the large conjugate side, a first subgroup having a positive refracting power, a second subgroup having a negative refracting power, and a third subgroup having a positive refracting power. The second lens group desirably satisfies a following relational expression (5), $$1.3 < f_{21}/f_{23} < 1.7 \quad (f_{21} > 0 \text{ and } f_{23} > 0) \tag{5}$$

where a symbol $f_{21}$ designates a focal length of the first subgroup and a symbol $f_{23}$ designates a focal length of the third subgroup.

Furthermore, the second lens group may comprise, in order from the large conjugate side, a first subgroup having a positive refracting power, a second subgroup having a negative refracting power and being composed of a lens having biconcave surfaces, and a third subgroup having a positive refracting power. The second lens group desirably satisfies following relational expressions (6) and (7), $$0.4 < |f_{22}|/f_2 < 0.7 \tag{6}$$

$$0.2 < (r_{n2} + r_{n1})/(r_{n2} - r_{n1}) < 0.75 \tag{7}$$

where a symbol $f_{22}$ designates a focal length of the biconcave negative lens of the second subgroup, a symbol $r_{n1}$ designates a radius of curvature of the large conjugate side surface of the biconcave negative lens of the second subgroup, and a symbol $r_{n2}$ designates a radius of curvature of a small conjugate side surface of the biconcave negative lens of the second subgroup.

Furthermore, the first lens group may comprise a plurality of negative lenses and a single positive lens, and desirably satisfies following relational expressions (8) and (9), $$\nu_{p1} < 32 \tag{8}$$

$$\nu_{n1} > 40 \tag{9}$$

where a symbol $\nu_{p1}$ designates the Abbe number of glass material constituting a positive lens of the first lens group and a symbol $\nu_{n1}$ designates an average of the Abbe numbers of glass materials constituting negative lenses within the first lens group.

BRIEF DESCRIPTION OF THE DRAWINGS

FIGS. 3A, 3B and 3C show characteristic curves of the spherical aberration, astigmatism and distortion of a zoom lens system at the minimum focal length state (f=117 [mm]) [mm]) according to the first embodiment;

FIGS. 4A, 4B and 4C show characteristic curves of the spherical aberration, astigmatism and distortion of a zoom lens system at the intermediate focal length state (f=146.3 [mm]) according to the first embodiment;

FIGS. 5A, 5B and 5C show characteristic curves of the spherical aberration, astigmatism and distortion of a zoom lens system at the maximum focal length state (f=175.5 [mm]) according to the first embodiment;

FIGS. 6A, 6B and 6C show characteristic curves of the spherical aberration, astigmatism and distortion of a zoom lens system at the minimum focal length state (F=117 [mm]) according to the second embodiment;

FIGS. 7A, 7B and 7C show characteristic curves of the spherical aberration, astigmatism and distortion of a zoom lens system at the intermediate focal length state (f=146.3 [mm]) according to the second embodiment;

FIGS. 8A, 8B and 8C show characteristic curves of the spherical aberration, astigmatism and distortion of a zoom lens system at the maximum focal length state (f=175.5 [mm]) according to the second embodiment;

FIGS. 9A, 9B and 9C show characteristic; curves of the spherical aberration, astigmatism and distortion of a zoom lens system at the minimum focal length state (f=117 [mm]) according to the third embodiment;

FIGS. 10A, 10B and 10C show characteristic curves of the spherical aberration astigmatism and distortion or a zoom lens system at the intermediate focal length state. (f=152.1 [mm]) according to the third embodiment;

FIGS. 11A, 11B and 11C show characteristic curves of the spherical aberration astigmatism and distortion of a zoom lens system at the maximum focal length state (f=187.2 [mm]) according to the third embodiment;

FIGS. 12A, 12B and 12C show characteristic curves of the spherical aberration, astigmatism and distortion of a zoom lens system at the minimum focal length state (f=117 [mm]) according to the fourth embodiment;

FIGS. 13A, 13B and 13C show characteristic curves of the spherical aberration astigmatism and distortion of a zoom lens system at the intermediate focal length state (f=152.1 [mm]) according to the fourth embodiment;

FIGS. 14A, 14B and 14C show characteristic curves of the spherical aberration astigmatism and distortion of a zoom lens system at the maximum focal length state (f=187.2 [mm]) according to the fourth embodiment;

FIGS. 15A, 15B and 15C show characteristic curves of the spherical aberration astigmatism and distortion of a zoom lens system at the minimum focal length state (f=117 [mm]) according to the fifth embodiment;

FIGS. 16A, 16B and 16C show characteristic curves of the spherical aberration astigmatism and distortion of a zoom lens system at the intermediate focal length state (f=152.1 [mm]) according to the fifth embodiment;

FIGS. 18A, 18B and 18C show characteristic curves of the spherical aberration astigmatism and distortion of a zoom lens system at the minimum focal length state (f=117 [mm]) according to the sixth embodiment;

FIGS. 19A, 19B and 19C show characteristic curves of the spherical aberration, astigmatism and distortion of a zoom lens system at the intermediate focal length state (f=152.1 [mm]) according to the sixth embodiment;

FIGS. 20A, 20B and 20C show characteristic curves of the spherical aberration, astigmatism and distortion of a zoom lens system at the maximum focal length state (f=187.2 [mm]) according to the sixth embodiment;

FIGS. 21A, 21B and 21C show characteristic curves of the spherical aberration, astigmatism and distortion of a zoom lens system at the minimum focal length state (f=117 [mm]) according to the seventh embodiment;

FIGS. 22A, 22B and 22C show characteristic curves of the spherical aberration, astigmatism and distortion of a zoom lens system at the intermediate focal length state (f=152.1 [mm]) according to the seventh embodiment;

FIGS. 23A, 23B and 23C show characteristic curves of the spherical aberration, astigmatism and distortion of a zoom lens system at the maximum focal length state (f=187.2 [mm]) according to the seventh embodiment.

DETAILED DESCRIPTION OF THE INVENTION

Preferred embodiments of the present invention will be described with reference to the attached drawings.

Figure 1:
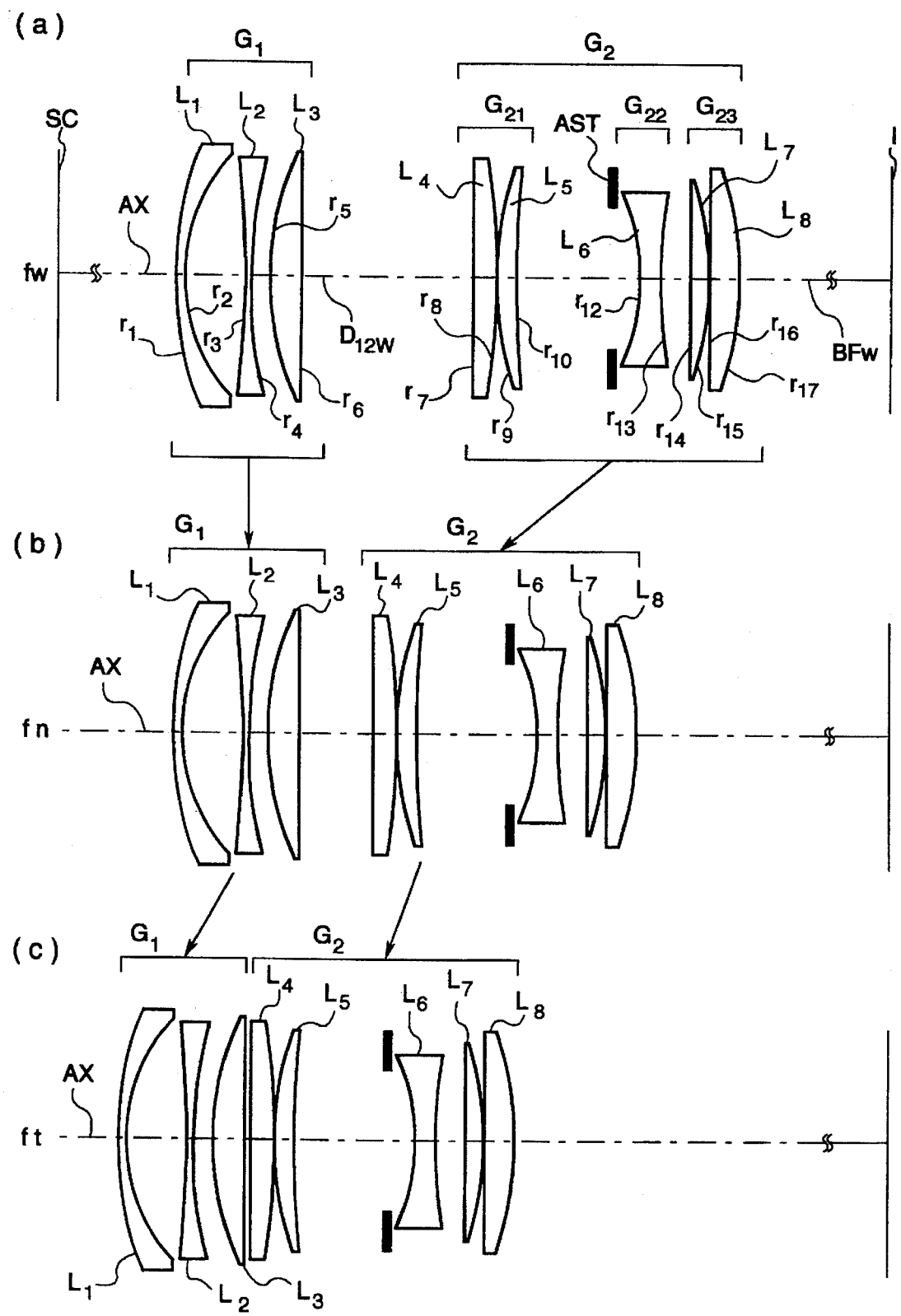
FIG. 1 is a cross-sectional view schematically showing a zoom lens system according to the first through third embodiments of the present invention.

FIG. 1 schematically shows a composition of a zoom lens system comprising eight lenses according to the first through third embodiments of the present invention, wherein an upper part (a) indicates a minimum focal length state, a middle part (b) indicates an intermediate focal length state, and a lower part (c) indicates a maximum focal length state.

As shown in FIG. 1, the zoom lens system according to the first through third embodiments comprises a first lens group $G_1$ having a negative refracting power, a second lens group $G_2$ having a positive refracting power, and an aperture stop AST. In FIG. 1, SC designates a screen and I designates an image display surface of a liquid-crystal panel. The screen SC and the image display surface I are in a conjugate relationship. In general, the screen SC is positioned on a large conjugate side and the image display surface I is positioned on a small conjugate side.

The first lens group $G_1$ comprises, in order from the large conjugate side (i.e., from the screen side), a negative meniscus first lens $L_1$ which is convex on the large conjugate side, a biconcave negative second lens $L_2$ and a positive third lens $L_3$. Since the first lens group $G_1$ includes two negative first and second lenses $L_1$ and $L_2$ positioned in front of the positive third lens $L_3$, an angle between an optical axis AX and the oblique light ray impinging on the first lens group $G_1$ from the large conjugate side can be reduced. Accordingly, on the condition that the position of the aperture stop AST is fixed, even though the field angle increases, the distance between the optical axis AX and the oblique light ray impinging on the first lens group $G_1$ will not become excessively large. As a result, the diameter of the first lens $L_1$ (i.e., the diameter of the front lens on the large conjugate side) can be made smaller. Furthermore, since the first lens group $G_1$ includes two negative first and second lenses $L_1$ and $L_2$ positioned in front of the positive third lens $L_3$, the retrofocus properties of the whole lens system are strengthened and thus a greater back focal length $BF_w$ can be easily obtained.

The second lens group $G_2$ comprises, in order from the large conjugate side, a first subgroup $G_{21}$ having a positive refracting power, a second subgroup $G_{22}$ having a negative refracting power and a third subgroup $G_{23}$ having a positive refracting power. The aperture stop AST is disposed between the first subgroup $G_{21}$ and the second subgroup $G_{22}$. The first subgroup $G_{21}$ comprises, in order from the large conjugate side, a positive fourth lens $L_4$ and a positive meniscus fifth lens $L_5$ which is convex on the large conjugate side. The second subgroup $G_{22}$ comprises a biconcave negative sixth lens $L_6$. The third subgroup $G_{23}$ comprises, in order from the large conjugate side, a positive meniscus seventh lens $L_7$ which is convex on the small conjugate side and a positive eighth lens $L_8$.

In the zoom lens system of FIG. 1, since the first lens group $G_1$ includes two negative first and second lenses $L_1$ and $L_2$ positioned in front of the positive third lens $L_3$, the first lens group $G_1$ produces the negative distortion which becomes larger on the minimum focal length state shown at the upper part (a) in FIG. 1. However, since a strong positive distortion generated by two strong positive fourth and fifth lenses $L_4$ and $L_5$ cancels out the negative distortion generated by the negative first and second lenses $L_1$ and $L_2$ of the first lens group $G_1$, the distortion of the whole lens system can be limited to a small value.

The changing of the focal length from the minimum focal length state (shown at (a) in FIG. 1) to the maximum focal length state (shown at (c) in FIG. 1) is accomplished by reducing the distance between the first lens group $G_1$ and the second lens group $G_2$ as shown in FIG. 1. For example, when the magnification is changed by moving the second lens group $G_2$ linearly toward the screen SC, the movement of the image that accompanies the change in magnification is compensated by moving the first lens group $G_1$ toward the screen SC nonlinearly or along a predetermined curved line. Furthermore, when changing the projection distance from the screen SC to the surface of the first lens $L_1$ on the large conjugate side, an adjustment of the focus of the whole lens system is accomplished by moving the first and second lens groups $G_1$ and $G_2$ as one unit in the direction of the optical axis AX. In this way, the zoom lens system of FIG. 1 is simplified to a two-group composition, and, in comparison with the conventional zoom lens system which comprises four or more lens groups, has fewer cams or other special mechanisms, with the result that the structure of the lens barrel can be greatly simplified.

Figure 2:
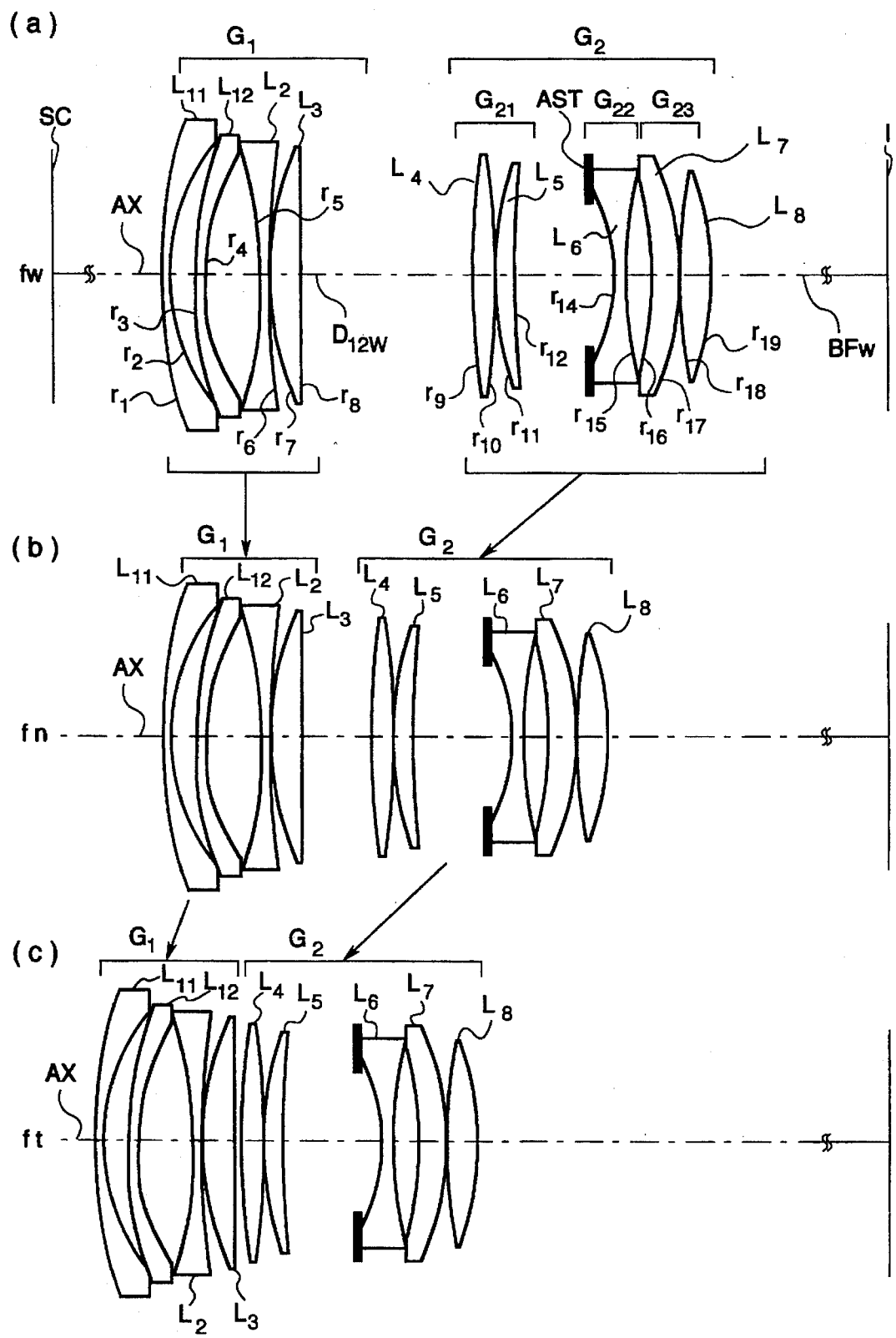
FIG. 2 is a cross-sectional view schematically showing a zoom lens system according to the fourth through seventh embodiments of the present invention.

FIG. 2 schematically shows a composition of a zoom lens system comprising nine lenses according to the fourth through seventh embodiments of the present invention, wherein an upper part (a) indicates a minimum focal length state, a middle part (b) indicates an intermediate focal length state, and a lower part (c) indicates a maximum focal length state.

The composition of the zoom lens system shown in FIG. 2 is the same as that shown in FIG. 1 with the exception that the first lens $L_1$ of FIG. 1 is divided into two negative meniscus lenses $L_{11}$ and $L_{12}$, both of which are convex on the large conjugate side. Accordingly, the first lens group $G_1$ comprises four lenses, which are the negative lens $L_{11}$, the negative lens $L_{12}$, the negative second lens $L_2$ and the positive lens $L_3$ in order from the large conjugate side.

Since the first lens group $G_1$ of FIG. 2 includes three negative lenses $L_{11}$, $L_{12}$ and $L_2$ positioned in front of the positive lens $L_3$, an angle between the optical axis AX and the oblique light ray impinging on the first lens group $G_1$ from the large conjugate side can be reduced. Accordingly, on the condition that the position of the aperture stop AST is fixed, even though the field angle increases, the distance between the optical axis and the oblique light ray impinging on the first lens group $G_1$ will not become excessively large. As a result, the diameter of the front lens $L_{11}$ can be made smaller. Furthermore, since the first lens group $G_1$ includes three negative lenses $L_{11}$, $L_{12}$ and $L_2$ positioned in front of the positive third lens $L_3$, the retrofocus properties of the whole lens system are strengthened and thus a greater back focal length can be easily obtained.

In the zoom lens system of FIG. 2, since the first lens group $G_1$ includes three negative lenses $L_{11}$, $L_{12}$ and $L_2$ positioned in front of the positive lenses $L_3$, the first lens group $G_1$ produces the negative distortion which becomes larger on the minimum focal length state (shown at (a) in FIG. 2). However, since a strong positive distortion generated by two strong positive lenses $L_4$ and $L_5$ cancels out the negative distortion generated by the negative lenses $L_{11}$, $L_{12}$ and $L_2$ of the first lens group $G_1$, a distortion of the whole lens system can be limited to a small value. The changing of the focal length from the minimum focal length state (shown at (a) in FIG. 2) to the maximum focal length state (shown at (c) in FIG. 2) is accomplished in time same manner as the zoom lens system of FIG. 1.

The retrofocus zoom lens systems shown in FIG. 1 and FIG. 2 are constituted so as to satisfy the following relational expressions:

$$0.9 < |f_1|/f_w < 1.2 \quad (1)$$

$$0.8 < f_2/f_w < 1.2 \quad (2)$$

$$0.3 < D_{12w}/f_w < 0.5 \quad (3)$$

$$BF_w/f_w > 1.5 \quad (4)$$

where a symbol $f_1$ designates a focal length of the first lens group $G_1$, a symbol $f_2$ designates a focal length of the second lens group $G_2$, a symbol $f_w$ designates a focal length of the whole lens system at the minimum focal length state, a symbol $D_{12w}$ designates an air gap between the first lens group $G_1$ and the second lens group $G_2$ when the whole lens system is at the minimum focal length state, and $BF_w$ designates a back focal length when the whole lens system is at the minimum focal length state.

Following is an explanation of the significance of the relational expressions (1) through (4). The expression (1) determines the range of the ratio between the focal length $f_1$ of the first lens group $G_1$ and the focal length $f_w$ of the whole lens system at the minimum focal length state. When $|f_1|/f_w$ is above the upper limit value 1.2 of the expression (1), the share of the negative refracting power of the first lens group $G_1$ is too small and the performance of the retrofocus system is weakened, so that it becomes difficult to maintain a long back focal length. Conversely, when $|f_1|/f_w$ is below the lower limit value 0.9 of the expression (1), sufficient back focal length can be easily secured but the negative refracting power of the first lens group $G_1$ becomes too strong, and a large astigmatism occurs at the off-axis area, which is difficult to compensate for. In addition, degradation of image-forming characteristics occurs due to the inclination of the image surface.

The expression (2) determines the range of the ratio between the focal length $f_2$ of the second lens group $G_2$ and the focal length $f_w$ of the whole lens system at the minimum focal length state. When $f_2/f_w$ is above the upper limit value 1.2 of the expression (2), sufficient back focal length can be easily secured but the requisite field angle is difficult to secure. Conversely, when $f_2/f_w$ is below the lower limit value 0.8 of the expression (2), the performance of the retrofocus system is weakened, so that it becomes difficult to maintain a long back focal length. In addition, a large astigmatism occurs at the off-axis area, which is difficult to compensate for.

The expression (3) determines the range of the ratio between the distance $D_{12w}$ between the first lens group $G_1$ and the second lens group $G_2$ and the focal length $f_w$ of the whole lens system at the minimum focal length state. Together with relational expressions (1) and (2), the expression (3) constitutes the precondition for maintaining satisfactory values of spherical aberration, astigmatism and distortion, and for limiting increases in the total length of the whole lens system and the diameter of the lens $L_1$ or $L_{11}$ disposed nearest to the large conjugate side. When $D_{12w}/f_w$ is above the upper limit value 0.5 of the expression (3), it not only becomes difficult to secure sufficient back focal length, but the outer diameter of the first lens group $G_1$ increases and total length of the whole lens system becomes unnecessarily great, making it difficult to realize the zoom lens system that is compact and low in cost. Conversely, when $D_{12w}/f_w$ is below the lower limit value 0.3 of the expression (3), sufficient back focal length can be easily secured, but the requisite zoom ratio is difficult to secure. In addition, it is difficult to satisfy the requisite field angle at the minimum focal length state.

Figure 24:
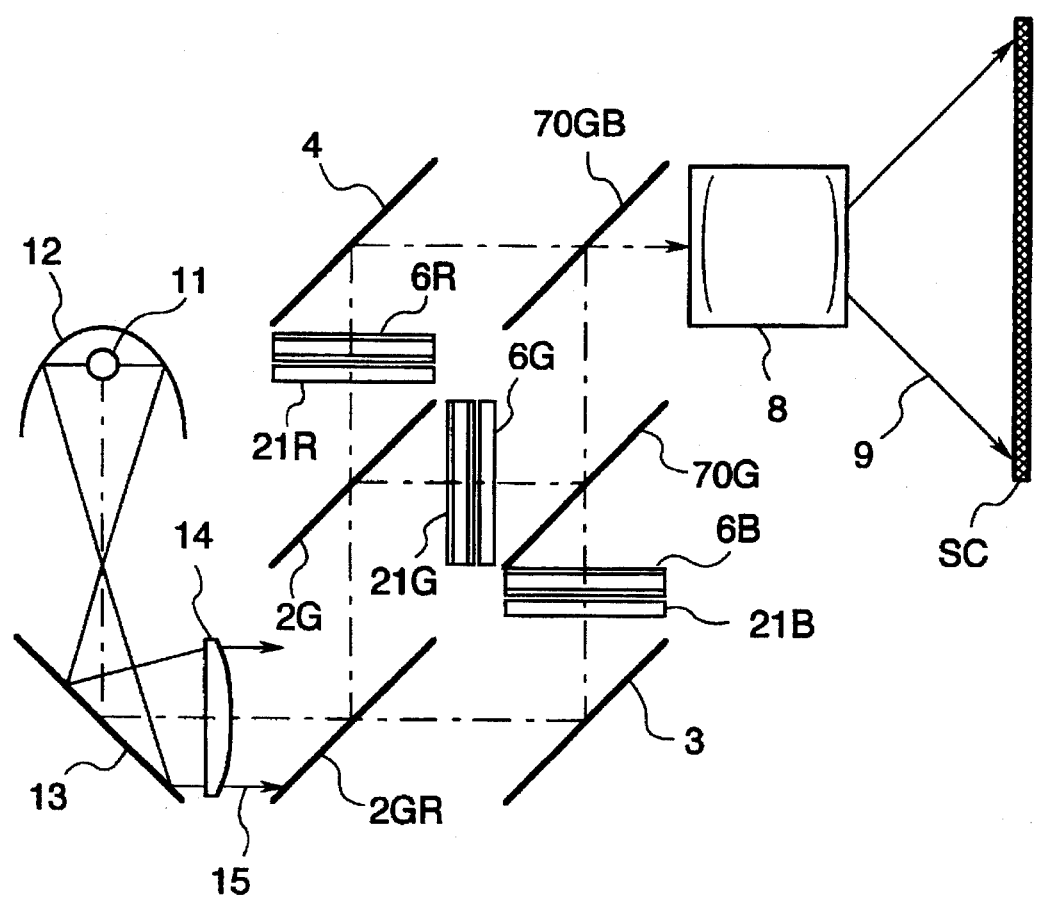
FIG. 24 is a structural diagram showing the composition of a projection-type display apparatus according to the prior art or the present invention.

The expression (4) determines the range of the ratio between the back focal length $BF_w$ of the whole lens system at the minimum focal length state and the focal length $f_w$ of the whole lens system at the minimum focal length state. The back focal length is shortest at the minimum focal length state, but it is necessary that sufficient back focal length be secured to enable the disposition of the color synthesizing dichroic mirrors, reflecting mirrors and other optical components shown in FIG. 24. If the back focal length $BF_w$ at the minimum focal length state becomes too short and $BF_w/f_w$ is below the lower limit value 1.5 of the expression (4), it becomes difficult to dispose these optical components.

The object of the present invention will have been achieved by satisfying the conditions of the expressions (1) to (4), but by further satisfying the following expression (5), more desirable image-forming characteristics can be realized.

$$1.3 < f_{21}/f_{23} < 1.7 \quad (f_{21} > 0 \text{ and } f_{23} > 0) \quad (5)$$

where a symbol $f_{21}$ designates a focal length of the first subgroup $G_{21}$ and a symbol $f_{23}$ designates a focal length of the third subgroup $G_{23}$.

The expression (5) sets a suitable refracting power ratio between the positive first subgroup $G_{21}$ and the positive third subgroup $G_{23}$, thereby securing the sufficient back focal length, while compensating for spherical aberration, astigmatism and distortion in a balanced manner.

When $f_{21}/f_{23}$ is above the upper limit value 1.7 of the expression (5), the refracting power of the first subgroup $G_{21}$ is weakened, the retrofocus properties of the whole lens system is strengthened and the back focal length is increased. The share of refracting power of the third subgroup $G_{23}$ in the total refracting power of the whole lens system, however, increases and, particularly at the minimum focal length state, negative distortion increases, which is undesirable. Conversely, when $f_{21}/f_{23}$ is below the lower limit value 1.3, at which the refracting power of the first subgroup $G_{21}$ becomes stronger than the refracting power of the third subgroup $G_{23}$, the retrofocus properties of the whole lens system is weakened, with the result that it becomes difficult to maintain satisfactory optical performance and at the same time obtain the sufficient back focal length.

Furthermore, by further satisfying the following relational expressions (6) and (7), more desirable image-forming characteristics can be realized, thereby suitably controlling spherical aberration and the like.

$$0.4 < |f_{22}|/f_2 < 0.7 \quad (6)$$

$$0.2 < (r_{n2} + r_{n1})/(r_{n2} - r_{n1}) < 0.75 \quad (7)$$

where the symbol $f_{22}$ designates a focal length of the biconcave negative lens of the second subgroup $G_{22}$, a symbol $r_{n1}$ designates a radius of curvature of a front surface of the biconcave negative lens $L_6$ of the second subgroup $G_{22}$ (on the large conjugate side), and a symbol $r_{n2}$ designates a radius of curvature of the rear surface of the biconcave negative lens $L_6$ of the second subgroup $G_{22}$ (on the small conjugate side).

When $|f_{22}|/f_2$ is above the upper limit value 0.7 of the expression (6), spherical aberration is insufficiently compensated. When $|f_{22}|/f_2$ is below the lower limit value 0.4, compensation for distortion is satisfactory, but compensation for spherical aberration is excessive, particularly at the maximum focal length state.

The expression (7) sets a suitable shape factor for the biconcave lens $L_6$ of the second subgroup $G_{22}$, and, together with the expression (6), gives the conditions for satisfactory compensation for spherical aberration. If $(r_{n2}+r_{n1})/(r_{n2}-r_{n1})$ is below the lower limit value 0.2 or above the upper limit value 0.75 of the expression (7), it is difficult to compensate satisfactorily for spherical aberration.

Furthermore, by further satisfying the following relational expressions (8) and (9), make it possible to keep chromatic aberration on the optical axis small.

$$v_{p1} < 32 \qquad (8)$$

$$v_{n1} > 40 \qquad (9)$$

where a symbol $v_{p1}$ designates the Abbe number of the glass material constituting the positive lens $L_3$ of the first lens group $G_1$ and a symbol $v_{n1}$ designates an average of the Abbe numbers of the glass materials constituting the negative lenses $L_1$ and $L_2$ (or $L_{11}$, $L_{12}$ and $L_2$) within the first lens group $G_1$.

The first lens group $G_1$ has a negative refracting power as a whole. For the purpose of compensating for chromatic aberration within the first lens group $G_1$, the Abbe number $v_{p1}$ of the positive lens must be smaller than the Abbe number $v_{n1}$ of the negative lenses. If the Abbe number $v_{p1}$ is above the upper limit value 32 of the expression (8), the dispersion of the glass of the positive lens $L_3$ of the first lens group $G_1$ becomes small, the negative chromatic aberration on the optical axis occurring at the lens $L_3$ will become too small. Again, if the Abbe number $v_{n1}$ in the negative lenses $L_1$ and $L_2$ (or $L_{11}$, $L_{12}$ and $L_2$) is below the lower limit value 40 of the expression (9), causing dispersion to become too great, the positive chromatic aberration on the optical axis occurring in those negative lenses will become too great. Accordingly, when relational expressions (8) and (9) are not satisfied, degradation will occur in the chromatic aberration on the optical axis of the whole lens system, and the image-forming performance will decline over the whole projected image.

The zoom lens system according to the first through seventh embodiments will be described below in detail. The significance of the symbols used in Tables 1 to 7 is shown below. Note that values of focal length, magnification and back focal length are those on the e line, the wavelength of which is 546.1 [nm].

f: focal length of whole lens system

ω: half field angle of projection light

F: effective F number on small conjugate side at standard projection magnification M: standard projection magnification $f_1$: focal length of first lens group $G_1$ $f_2$: focal length of second lens group $G_2$ $f_{21}$: focal length of first subgroup $G_{21}$ $f_{22}$: focal length of second subgroup $G_{22}$ $f_{23}$: focal length of third subgroup $G_{23}$ $D_{12w}$: air gap between first lens group $G_1$ and second lens group $G_2$ at minimum focal length state $BF_w$: back focal length at minimum focal length state $r_{n1}$: radius of curvature of front surface of biconcave negative lens $L_6$ of second subgroup $G_{22}$ (on large conjugate side);

$r_{n2}$: radius of curvature of rear surface of biconcave negative lens $L_6$ of second subgroup $G_{22}$ (on small conjugate side)

$v_{p1}$: Abbe number of glass constituting positive lens of first lens group $G_1$ $v_{n1}$: average of Abbe numbers of glass constituting negative lenses of first lens group $G_1$ $f_w$: focal length of whole lens system at minimum focal length state $f_n$: focal length of whole lens system at intermediate focal length state (when $f_n=(f_w+f_t)/2$)

$f_t$: focal length of whole lens system at maximum focal length state m: number of surfaces counted in order from screen surface side $r_i$: radius of curvature of i-th lens surface counted from screen side $d_i$: distance (i.e., thickness or air gap) from i-th lens surface to (i+1)-th lens surface counted from screen surface side $n_i$: refractive index between i-th lens surface and (i+1)-th lens surface counted from screen side at wavelength of 587.6 [nm] (d line)

$v_i$: Abbe number between i-th lens surface and (i+1)-th lens surface counted from screen side AST: aperture stop a: variable gap FIGS. 3A, 3B and 3C, FIGS. 4A, 4B and 4C, and FIGS. 5A, 5B and 5C show characteristic curves of the zoom lens system according to the first embodiment when viewed from the small conjugate side, wherein FIGS. 3A, 3B and 3C show the characteristic curves of the spherical aberration, astigmatism and distortion at the minimum focal length state (f=117 [mm]), FIGS. 4A, 4B and 4C show the characteristic curves of the spherical aberration, astigmatism and distortion at the intermediate focal length state (f=146.3 [mm]), and FIGS. 5A, 5B and 5C show the characteristic curves of the spherical aberration, astigmatism and distortion at the maximum focal length state (f=175.5 [mm])). The spherical aberration curves in FIG. 3A, FIG. 4A and FIG. 5A are shown for three wavelengths of $WL_1$=610 [nm], $WL_2$=546.1 [nm] (e line) and $WL_3$=470 [nm]. The astigmatic field curves in FIG. 3B, FIG. 4B and FIG. 5B are shown for the wavelength of 546.1 [nm] (e line). The distortion curves in FIG. 3C, FIG. 4C and FIG. 5C are shown for the wavelength of 546.1 [nm] (e line). Specific examples of the zoom lens system of the first embodiment are shown in Table 1 below. The distance or length in Table 1 is expressed in millimeter.

TABLE 1 f = 117.00 to 175.50 ω = 24.74° to 16.85° F = 4.50
M = 31.75 to 20.80
$f_1 = -127.09$ $f_2 = 116.82$ $f_{21} = 107.18$ $f_{22} = -62.95$ $f_{23} = 70.05$
$D_{12w} = 44.09$ $BF_w = 190.00$ $r_{n1} = -56.80$ $r_{n2} = 238.43$
$v_{p1} = 28.32$ $v_{n1} = 45.65$
$|f_1|/f_w = 1.09$ $f_2/f_w = 1.00$ $D_{12w}/f_w = 0.38$ $BF_w/f_w = 1.62$
$f_{21}/f_{23} = 1.53$ $|f_{22}|/f_2 = 0.54$
$(r_{n2} + r_{n1})/(r_{n2} - r_{n1}) = 0.62$

| m | $r_i$ | $d_i$ | $n_i$ | $v_i$ |
|---|---|---|---|---|
| 1 | 104.48264 | 2.00 | 1.834000 | 37.35 |
| 2 | 49.92630 | 15.38 | | |
| 3 | -429.10976 | 2.00 | 1.712999 | 53.94 |
| 4 | 112.16860 | 4.60 | | |
| 5 | 81.09217 | 8.00 | 1.728251 | 28.32 |
| 6 | 807.26338 | a | | |
| 7 | INFINITY | 6.00 | 1.712999 | 53.94 |
| 8 | -155.59250 | 0.30 | | |
| 9 | 81.20685 | 5.00 | 1.516798 | 64.20 |
| 10 | 302.33825 | 25.88 | | |
| 11 | INFINITY | 5.35 | | AST |
| 12 | -56.80327 | 5.50 | 1.717359 | 29.50 |
| 13 | 238.43487 | 7.60 | | |
| 14 | -167.34231 | 5.00 | 1.712999 | 53.94 |
| 15 | -66.76728 | 0.30 | | |
| 16 | -1070.56266 | 8.00 | 1.563839 | 60.83 |
| 17 | -67.37806 | | | |

| VARIABLE GAP | $f_w$ | $f_n$ | $f_t$ |
|---|---|---|---|
| a | 44.09 | 18.72 | 1.80 |

FIGS. 6A, 6B and 6C, FIGS. 7A, 7B and 7C, and FIGS. 8A, 8B and 8C show characteristic curves of the zoom lens system according to the second embodiment when viewed from the small conjugate side, wherein FIGS. 6A, 6B and 6C show the characteristic curves of the spherical aberration, astigmatism and distortion at the minimum focal length state (f=117 [mm]), FIGS. 7A, 7B and 7C show the characteristic curves of the spherical aberration, astigmatism and distortion at the intermediate focal length state (F=146.3 [mm]), and FIGS. 8A, 8B and 8C show the characteristic curves of the spherical aberration, astigmatism and distortion at the maximum focal length state (f=175.5 [mm]). The spherical aberration curves in FIG. 6A, FIG. 7A and FIG. 8A are shown for three wavelengths of $WL_1$=610 [nm], $WL_2$=546.1 [nm] (e line) and $WL_3$=470 [nm]. The astigmatic field curves in FIG. 6B, FIG. 7B and FIG. 8B are shown for the wavelength of 546.1 [nm] (e line). The distortion curves in FIG. 6C, FIG. 7C and FIG. 8C are shown for the wavelength of 546.1 [nm] (e line). Specific examples of the zoom lens system of the second embodiment are shown in Table 2 below. The distance or length in Table 2 is expressed in millimeter.

TABLE 2 f = 117.00 to 175.50 ω = 24.45° to 16.64° F = 4.50
M = 31.75 to 20.80
$f_1 = -125.64$ $f_2 = 115.20$ $f_{21} = 105.40$ $f_{22} = -62.47$ $f_{23} = 69.75$
$D_{12w} = 43.04$ $BF_w = 190.00$ $r_{n1} = -55.15$ $r_{n2} = 259.98$
$v_{p1} = 28.32$ $v_{n1} = 45.65$
$|f_1|/f_w = 1.07$ $f_2/f_w = 0.98$ $D_{12w}/f_w = 0.37$ $BF_w/f_w = 1.62$
$f_{21}/f_{23} = 1.51$ $|f_{22}|/f_2 = 0.54$
$(r_{n2} + r_{n1})/(r_{n2} - r_{n1}) = 0.65$

| m | $r_i$ | $d_i$ | $n_i$ | $v_i$ |
|---|---|---|---|---|
| 1 | 102.44523 | 3.80 | 1.834000 | 37.35 |
| 2 | 48.76589 | 15.50 | | |
| 3 | -386.84997 | 3.80 | 1.712999 | 53.94 |
| 4 | 111.07785 | 3.59 | | |
| 5 | 79.17980 | 8.00 | 1.728251 | 28.32 |
| 6 | 914.40918 | a | | |
| 7 | INFINITY | 6.00 | 1.712999 | 53.94 |
| 8 | -150.26591 | 0.30 | | |
| 9 | 82.50050 | 5.00 | 1.516798 | 64.20 |
| 10 | 320.65297 | 24.27 | | |
| 11 | INFINITY | 5.49 | | AST |
| 12 | -55.15337 | 5.50 | 1.717359 | 29.50 |
| 13 | 259.98150 | 7.41 | | |
| 14 | -146.49466 | 5.00 | 1.712999 | 53.94 |
| 15 | -63.88569 | 0.30 | | |
| 16 | -977.80369 | 8.00 | 1.563839 | 60.83 |
| 17 | -65.86040 | | | |

| VARIABLE GAP | $f_w$ | $f_n$ | $f_t$ |
|---|---|---|---|
| a | 43.04 | 18.29 | 1.80 |

FIGS. 9A, 9B and 9C, FIGS. 10A, 10B and 10C, and FIGS. 11A, 11B and 11C show characteristic curves of the zoom lens system according to the third embodiment when viewed from the small conjugate side, wherein FIGS. 9A, 9B and 9C show the characteristic curves of the spherical aberration, astigmatism and distortion at the minimum focal length state (f=117 [mm]), FIGS. 10A, 10B and 10C show the characteristic curves of the spherical aberration, astigmatism and distortion at the intermediate focal length state (f=152.1 [mm]), and FIGS. 11A, 11B and 11C show the characteristic curves of the spherical aberration, astigmatism and distortion at the maximum focal length state (f=187.2 [mm]). The spherical aberration curves in FIG. 9A, FIG. 10A and FIG. 11A are shown for three wavelengths of $WL_1$=610 [nm], $WL_2$=546.1 [nm] (e line) and $WL_3$=470 [nm]. The astigmatic field curves in FIG. 9B, FIG. 10B and FIG. 11B are shown for the wavelength of 546.1 [nm] (e line). The distortion curves in FIG. 9C, FIG. 10C and FIG. 11C are shown for the wavelength of 546.1 [nm] (e line). Specific examples of the zoom lens system of the third embodiment are shown in Table 3 below. The distance or length in Table 3 is expressed in millimeter.

TABLE 3 f = 117.00 to 187.20 ω = 24.58° to 15.70° F = 4.50
M = 31.75 to 19.43
$f_1 = -123.37$ $f_2 = 113.83$ $f_{21} = 100.36$ $f_{22} = -61.59$ $f_{23} = 70.85$
$D_{12w} = 47.01$ $BF_w = 190.80$ $r_{n1} = 67.62$ $r_{n2} = 133.51$
$v_{p1} = 28.32$ $v_{n1} = 45.65$
$|f_1|/f_w = 1.05$ $f_2/f_w = 0.97$ $D_{12w}/f_w = 0.40$ $BF_w/f_w = 1.63$
$f_{21}/f_{23} = 1.42$ $|f_{22}|/f_2 = 0.54$
$(r_{n2} + r_{n1})/(r_{n2} - r_{n1}) = 0.33$

| m | $r_i$ | $d_i$ | $n_i$ | $v_i$ |
|---|---|---|---|---|
| 1 | 97.11306 | 3.80 | 1.834000 | 37.35 |
| 2 | 47.39013 | 19.01 | | |
| 3 | -169.12732 | 3.80 | 1.712999 | 53.94 |
| 4 | 144.41371 | 0.30 | | |
| 5 | 84.27286 | 8.00 | 1.728251 | 28.32 |
| 6 | -872.36087 | a | | |
| 7 | 182.61120 | 6.00 | 1.712999 | 53.94 |
| 8 | -390.99953 | 0.30 | | |
| 9 | 82.28925 | 5.00 | 1.516798 | 64.20 |
| 10 | 248.85672 | 20.64 | | |
| 11 | INFINITY | 5.01 | | AST |
| 12 | -67.62239 | 3.80 | 1.717359 | 29.50 |
| 13 | 133.51426 | 6.93 | | |
| 14 | -138.40205 | 7.10 | 1.712999 | 53.94 |
| 15 | -76.74436 | 0.30 | | |
| 16 | 388.35880 | 8.00 | 1.563839 | 60.83 |
| 17 | -67.77176 | | | |

| VARIABLE GAP | $f_w$ | $f_n$ | $f_t$ |
|---|---|---|---|
| a | 47.01 | 19.31 | 2.00 |

FIGS. 12A, 12B and 12C, FIGS. 13A, 13B and 13C, and FIGS. 14A, 14B and 14C show characteristic curves of the zoom lens system according to the fourth embodiment when viewed from the small conjugate side, wherein FIGS. 12A, 12B and 12C show the characteristic curves of the spherical aberration, astigmatism and distortion at the minimum focal length state (f=117 [mm]), FIGS. 13A, 13B and 13C show the characteristic curves of the spherical aberration, astigmatism and distortion at the intermediate focal length state (f=152.1 [mm]), and FIGS. 14A, 14B and 14C show the characteristic curves of the spherical aberration, astigmatism and distortion at the maximum focal length state (f=187.2 [mm]). The spherical aberration curves in FIG. 12A, FIG. 13A and FIG. 14A are shown for three wavelengths of $WL_1$=610 [nm], $WL_2$=546.1 [nm] (e line) and $WL_3$=470 [nm]. The astigmatic field curves in FIG. 12B, FIG. 13B and FIG. 14B are shown for the wavelength of 546.1. [nm] (e line). The distortion curves in FIG. 12C, FIG. 13C and FIG. 14C are shown for the wavelength of 546.1 [nm] (e line). Specific examples of the zoom lens system of the fourth embodiment are shown in Table 4 below. The distance or length in Table 4 is expressed in millimeter.

TABLE 4 f = 117.00 to 187.20 ω = 24.57° to 15.70° F = 4.50
M = 31.75 to 19.44
$f_1$ = −119.51 $f_2$ = 110.66 $f_{21}$ = 100.15 $f_{22}$ = −56.22 $f_{23}$ = 64.10
$D_{12w}$ = 44.39 $BF_w$ = 190.80 $r_{n1}$ = −65.18 $r_{n2}$ = 128.38
$v_{p1}$ = 30.05 $v_{n1}$ = 45.91
$|f_1|/f_w$ = 1.02 $f_2/f_w$ = 0.95 $D_{12w}/f_w$ = 0.38 $BF_w/f_w$ = 1.63
$f_{21}/f_{23}$ = 1.56 $|f_{22}|/f_2$ = 0.51
$(r_{n2} + r_{n1})/(r_{n2} − r_{n1})$ = 0.33

| m | $r_i$ | $d_i$ | $n_i$ | $v_i$ | |
|---|---|---|---|---|---|
| 1 | 82.40889 | 3.80 | 1.743999 | 44.87 | |
| 2 | 47.38280 | 5.77 | | | |
| 3 | 69.10868 | 3.80 | 1.743999 | 44.87 | |
| 4 | 55.77233 | 13.35 | | | |
| 5 | −215.22899 | 3.80 | 1.717000 | 47.98 | |
| 6 | 157.62753 | 0.30 | | | |
| 7 | 75.68153 | 8.00 | 1.698944 | 30.05 | |
| 8 | 689.68823 | a | | | |
| 9 | 167.22555 | 6.00 | 1.650201 | 55.74 | |
| 10 | −380.66395 | 0.30 | | | |
| 11 | 80.08665 | 5.00 | 1.589002 | 48.54 | |
| 12 | 193.65097 | 20.03 | | | |
| 13 | INFINITY | 5.06 | | | AST |
| 14 | −65.18179 | 3.80 | 1.756897 | 31.80 | |
| 15 | 128.38192 | 5.63 | | | |
| 16 | −156.34279 | 7.68 | 1.612717 | 58.58 | |
| 17 | −73.20968 | 0.30 | | | |
| 18 | 288.32988 | 8.00 | 1.589128 | 61.25 | |
| 19 | −65.44143 | | | | |

| VARIABLE GAP | $f_w$ | $f_n$ | $f_t$ |
|---|---|---|---|
| a | 44.39 | 18.30 | 2.00 |

Figures 17A, 17B, 17C:
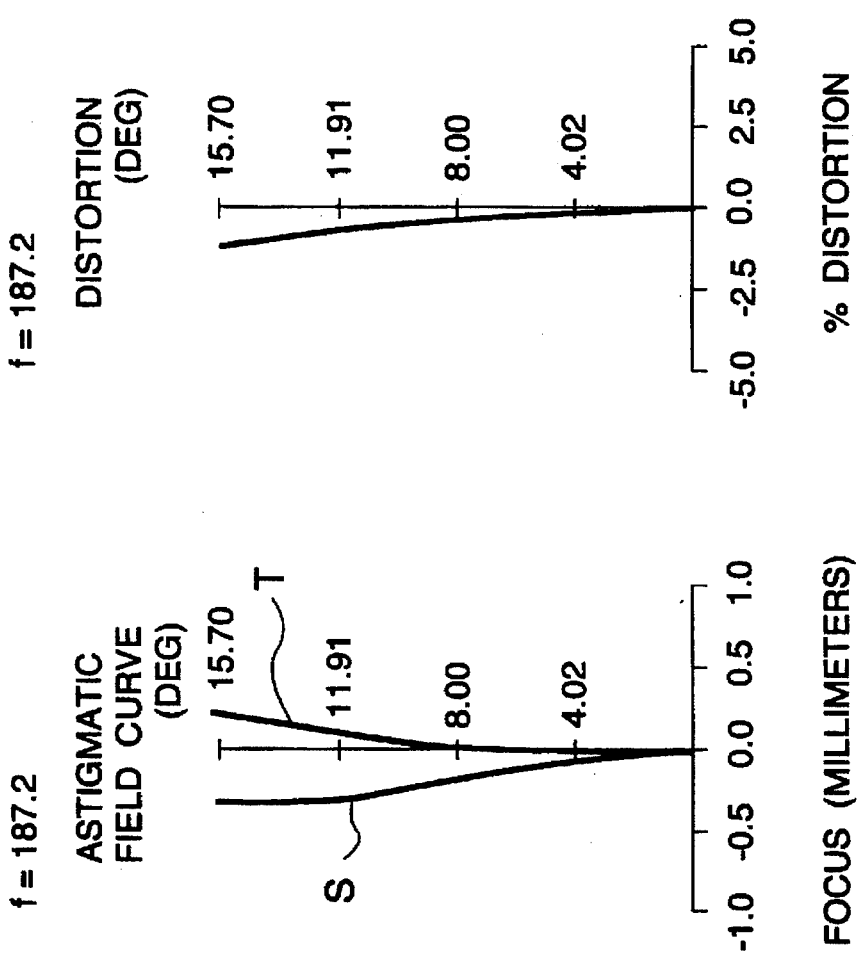
FIGS. 17A, 17B and 17C show characteristic curves of the spherical aberration astigmatism and distortion of a zoom lens system at the maximum focal length state (f=187.2 [mm]) according to the fifth embodiment.

FIGS. 15A, 15B and 15C, FIGS. 16A, 16B and 16C, and FIGS. 17A, 17B and 17C show characteristic curves of the zoom lens system according to the fifth embodiment when viewed from the small conjugate side, wherein FIGS. 15A, 15B and 15C show the characteristic curves of the spherical aberration, astigmatism and distortion at the minimum focal length state (f=117 [mm]), FIGS. 16A, 16B and 16C show the characteristic curves of the spherical aberration, astigmatism and distortion at the intermediate focal length state (f=152.1 [mm]), and FIGS. 17A, 17B and 17C show the characteristic curves of the spherical aberration, astigmatism and distortion at the maximum focal length state (f=187.2 [mm]). The spherical aberration curves in FIG. 15A, FIG. 16A and FIG. 17A are shown for three wavelengths of $WL_1$=610 [nm], $WL_2$=546.1 [nm] (e line) and $WL_3$=470 [nm]. The astigmatic field curves in FIG. 15B, FIG. 16B and FIG. 17B are shown for the wavelength of 546.1 [nm] (e line). The distortion curves in FIG. 15C, FIG. 16C and FIG. 17C are shown for the wavelength of 546.1 [nm] (e line). Specific examples of the zoom lens system of the fifth embodiment are shown in Table 5 below. The distance or length in Table 5 is expressed in millimeter.

TABLE 5 f = 117.00 to 187.20 ω = 24.57° to 15.70° F = 4.50
M = 31.75 to 19.44
$f_1$ = −117.19 $f_2$ = 110.80 $F_{21}$ = 97.82 $F_{22}$ = 54.93 $F_{23}$ = 63.71
$D_{12w}$ = 43.62 $BF_w$ = 190.80 $r_{n1}$ = −67.97 $r_{n2}$ = 128.02
$v_{p1}$ = 29.44 $v_{n1}$ = 45.10
$|f_1|/f_w$ = 1.00 $f_2/f_w$ = 0.95 $D_{12w}/f_w$ = 0.37 $BF_w/f_w$ = 1.63
$f_{21}/f_{23}$ = 1.54 $|f_{22}|/f_2$ = 0.50
$(r_{n2} + r_{n1})/(r_{n2} − r_{n1})$ = 0.31

| m | $r_i$ | $d_i$ | $n_i$ | $v_i$ | |
|---|---|---|---|---|---|
| 1 | 83.97432 | 3.80 | 1.806000 | 40.70 | |
| 2 | 46.70251 | 6.68 | | | |
| 3 | 75.47414 | 3.80 | 1.806000 | 40.70 | |
| 4 | 64.16650 | 12.31 | | | |
| 5 | −167.19973 | 3.80 | 1.713000 | 53.90 | |
| 6 | 165.96583 | 0.30 | | | |
| 7 | 81.10987 | 8.00 | 1.701215 | 29.44 | |
| 8 | −2448.18779 | a | | | |
| 9 | 171.65234 | 6.00 | 1.713000 | 53.90 | |
| 10 | −474.39115 | 0.30 | | | |
| 11 | 79.41413 | 5.00 | 1.542414 | 64.82 | |
| 12 | 235.59711 | 21.32 | | | |
| 13 | INFINITY | 4.92 | | | AST |
| 14 | −67.96841 | 3.80 | 1.795407 | 31.61 | |
| 15 | 128.02032 | 5.96 | | | |
| 16 | −140.50475 | 7.10 | 1.713000 | 53.90 | |
| 17 | −76.51524 | 0.30 | | | |
| 18 | 268.32473 | 8.00 | 1.595464 | 61.63 | |
| 19 | −65.75338 | | | | |

| VARIABLE GAP | $f_w$ | $f_n$ | $f_t$ |
|---|---|---|---|
| a | 43.62 | 18.01 | 2.00 |

FIGS. 18A, 18B and 18C, FIGS. 19A, 19B and 19C, and FIGS. 20A, 20B and 20C show characteristic curves of the zoom lens system according to the sixth embodiment when viewed from the small conjugate side, wherein FIGS. 18A, 18B and 18C show the characteristic curves of the spherical aberration, astigmatism and distortion at the minimum focal length state (f=117 [mm]), FIGS. 19A, 19B and 19C show the characteristic curves of the spherical aberration, astigmatism and distortion at the intermediate focal length state (f=152.1 [mm]), and FIGS. 20A, 20B and 20C show the characteristic curves of the spherical aberration, astigmatism and distortion at the maximum focal length state (f=187.2 [mm]). The spherical aberration curves in FIG. 18A, FIG. 19A and FIG. 20A are shown for three wavelengths of $WL_1$=610 [nm], $WL_2$=546.1 [nm] (e line) and $WL_3$=470 [nm]. The astigmatic field curves in FIG. 18B, FIG. 19B and FIG. 20B are shown for the wavelength of 546.1 [nm] (e line). The distortion curves in FIG. 18C, FIG. 19C and FIG. 20C are shown for the wavelength of 546.1 [nm] (e line). Specific examples of the zoom lens system of the sixth embodiment are shown in Table 6 below. The distance length in Table 6 is expressed in millimeter.

TABLE 6 f = 117.00 to 187.20 ω = 24.57° to 15.70° F = 4.50
M = 31.75 to 19.44
$f_1$ = 117.30 $f_2$ = 110.92 $f_{21}$ = 97.28 $f_{22}$ = −53.89 $f_{22}$ = 62.94
$D_{12w}$ = 43.70 $BF_w$ = 190.80 $r_{n1}$ = −68.37 $r_{n2}$ = 131.35
$v_{p1}$ = 28.52 $v_{n1}$ = 42.83
$|f_1|/f_w$ = 1.00 $f_2/f_w$ = 0.95 $D_{12w}/f_w$ = 0.37 $BF_w/f_w$ = 1.63
$f_{21}/f_{23}$ = 1.55 $|f_{22}|/f_2$ = 0.49
$(r_{n2} + r_{n1})/(r_{n2} − r_{n1})$ = 0.32

| m | $r_i$ | $d_i$ | $n_i$ | $v_i$ |
|---|---|---|---|---|
| 1 | 84.11185 | 3.80 | 1.834000 | 37.30 |
| 2 | 46.75790 | 6.72 | | |
| 3 | 76.26586 | 3.80 | 1.834000 | 37.30 |

TABLE 6-continued

| | | | | |
|---|---|---|---|---|
| 4 | 66.02314 | 12.15 | | |
| 5 | -161.72941 | 3.80 | 1.713000 | 53.90 |
| 6 | 164.16688 | 0.30 | | |
| 7 | 82.55982 | 8.00 | 1.726179 | 28.52 |
| 8 | -1955.58972 | a | | |
| 9 | 177.77296 | 6.00 | 1.713000 | 53.90 |
| 10 | -440.77802 | 0.30 | | |
| 11 | 79.09526 | 5.00 | 1.554694 | 58.03 |
| 12 | 230.48676 | 21.56 | | |
| 13 | INFINITY | 4.87 | | AST |
| 14 | -68.37233 | 3.80 | 1.820979 | 30.99 |
| 15 | 131.34733 | 5.85 | | |
| 16 | -139.94204 | 7.06 | 1.713000 | 53.90 |
| 17 | -76.61984 | 0.30 | | |
| 18 | 282.31775 | 8.00 | 1.612013 | 60.72 |
| 19 | -65.60355 | | | |

| VARIABLE GAP | $f_w$ | $f_m$ | $f_t$ |
|---|---|---|---|
| a | 43.70 | 18.04 | 2.00 |

FIGS. 21A, 21B and 21C, FIGS. 22A, 22B and 22C, and FIGS. 23A, 23B and 23C show characteristic curves of the zoom lens system according to the seventh embodiment when viewed from the small conjugate side, wherein FIGS. 21A, 21B and 21C show the characteristic curves of the spherical aberration, astigmatism and distortion at the minimum focal length state (f=117 [mm]), FIGS. 21A, 21B and 21C show the characteristic curves of the spherical aberration, astigmatism and distortion at the intermediate focal length state (f=152.1 [mm]), and FIGS. 22A, 22B and 22C show the characteristic curves of the spherical aberration, astigmatism and distortion at the maximum focal length state (f=187.2 [mm]). The spherical aberration curves in FIG. 21A, FIG. 22A and FIG. 23A are shown for three wavelengths of $WL_1$=610 [nm], $WL_2$=546.1 [nm] (e line) and $WL_3$=470 [nm]. The astigmatic field curves in FIG. 21B, FIG. 22B and FIG. 23B are shown for the wavelength of 546.1 [nm] (e line). The distortion curves in FIG. 21C, FIG. 22C and FIG. 23C are shown for the wavelength of 546.1 [nm] (e line). Specific examples of the zoom lens system of the seventh embodiment are shown in Table 7 below. The distance or length in Table 7 is expressed in millimeter.

TABLE 7 f = 117.00 to 187.20 ω = 24.57° to 15.70° F = 4.50
M = 31.75 to 19.44
$f_1$ = -115.96 $f_2$ = 109.71 $f_{21}$ = 94.45 $f_{22}$ = -55.54 $f_{23}$ = 65.58
$D_{12w}$ = 42.77 $BF_w$ = 191.00 $r_{n1}$ = -67.61 $r_{n2}$ = 132.57
$v_{p1}$ = 28.49 $v_{n1}$ = 45.10
$|f_1|/f_w$ = 0.99 $f_2/f_w$ = 0.94 $D_{12w}/f_w$ = 0.37 $BF_w/f_w$ = 1.63
$(r_{n2} + r_{n1})/(r_{n2} - r_{n1})$ = 0.32

| m | $r_i$ | $d_i$ | $n_i$ | $v_i$ |
|---|---|---|---|---|
| 1 | 84.95091 | 3.80 | 1.806000 | 40.70 |
| 2 | 46.71000 | 6.54 | | |
| 3 | 76.17801 | 3.80 | 1.806000 | 40.70 |
| 4 | 63.14130 | 12.07 | | |
| 5 | -170.31380 | 3.80 | 1.713000 | 53.90 |
| 6 | 165.03217 | 0.30 | | |
| 7 | 81.14941 | 8.00 | 1.719396 | 28.49 |
| 8 | -2447.83496 | a | | |
| 9 | 170.76007 | 6.00 | 1.650846 | 57.81 |
| 10 | -341.42588 | 0.30 | | |
| 11 | 78.30954 | 5.00 | 1.550768 | 60.14 |
| 12 | 251.11868 | 19.53 | | |
| 13 | INFINITY | 5.02 | | AST |
| 14 | -67.60575 | 3.80 | 1.793252 | 30.22 |
| 15 | 132.56695 | 5.90 | | |
| 16 | -139.05902 | 7.07 | 1.620000 | 60.30 |

TABLE 7-continued

| | | | | |
|---|---|---|---|---|
| 17 | -76.64631 | 0.30 | | |
| 18 | 549.48221 | 8.00 | 1.675587 | 56.10 |
| 19 | -66.20626 | | | |

| VARIABLE GAP | $f_w$ | $f_m$ | $f_t$ |
|---|---|---|---|
| a | 42.77 | 17.68 | 2.00 |

As described above, by means of the zoom lens system according to the first through seventh embodiments, satisfactory performance in terms of greater back focal length, shorter focal length at the minimum focal length state, higher resolution, lower distortion and smaller chromatic aberration can be obtained. At the same time a smaller zoom lens system with a lens barrel of simpler construction can be obtained. Specifically, it is possible to obtain a two-group zoom lens system consisting of eight or nine lenses, and having an F number of 4.5 or more, a half field angle at the minimum focal length state of approximately 24° to 25°, a back focal length 1.5 times or more greater than the focal length at the minimum focal length state and a zoom ratio of approximately 1.5 to 1.6.

To make the effective F number constant irrespective of the zoom state, the aperture stop AST must be continuously changed so that the aperture diameter is maximum at the maximum focal length state and minimum at the minimum focal length state. To simplify the lens barrel mechanism, however, the aperture stop diameter may be held constant. If, as in the first embodiment, for example, the effective F number at the minimum focal length state is 4.50, the effective F number at the maximum focal length state, with aperture stop diameter fixed, will be 5.69.

Further, as is well known in the field of the camera lenses and the like, the zoom lens system of the present invention may be so constituted that the user can change the aperture stop diameter freely. In this case, by changing the aperture stop diameter, it is possible to regulate the brightness of the image projected by a liquid-crystal projector.

And if the scattering-mode liquid crystals such as polymer-dispersed liquid crystals (PDLCs), dynamic scattering-mode liquid crystals (DSM-LCs) or the like, wherein the state of scatter of the impinging light is modulated according to the voltage or current applied, is used, it is possible to regulate the brightness and contrast of the projected image according to the aperture stop diameter.

Following is a description of the projection-type display apparatus of the present invention. The projection-type display apparatus of the present invention comprises the same construction of the apparatus shown in FIG. 24 with the exception that the projection lens 8 is replaced by any one of the above-described zoom lens systems according to the first through seventh embodiments.

Images in the three primary colors, which were formed by three monochromic liquid-crystal panels 6R, 6G and 6B, are synthesized by the dichroic mirrors 70G and 70GB, and the color image projection beam 9 is projected onto the screen SC by the zoom lens system of the present invention. Since the zoom lens system of the present invention is used as the projection lens 8, a sufficient field angle of the projection light can be obtained at the minimum focal length state, with the result that a large image can be realized at a short projection distance, and satisfactory display characteristics, with high resolution and low distortion and chromatic aberration, can be obtained. Moreover, the size of the image can be conveniently regulated by means of the zoom function of the zoom lens system. Since the zoom lens system of the present invention comprises only two lens groups, a barrel mechanism having the lens system can be simplified and the cost of manufacturing the apparatus can be reduced.

Again, since the aperture stop diameter of the zoom lens system is so constructed as to be variable, the brightness of the projected image can be controlled. Specifically, if using scattering-mode liquid crystal panel, the scatter state of the light impinging whereon can be modulated in accordance with the electrical signal applied, such as the well known polymer-dispersed or dynamic scattering-mode liquid crystals (PDLCs or DSM-LCs), making it possible for the viewer freely to control the aperture stop diameter and thereby regulate both the brightness and contrast of the projected image.

What is claimed is:

1. A zoom lens system comprising, in order from a large conjugate side:

a first lens group having a negative refracting power; and a second lens group having a positive refracting power;

a focal length of said zoom lens system being longer, as a gap between said first lens group and said second lens group is reduced;

wherein said zoom lens system satisfies following relational expressions (1) to (4), $$0.9 < |f_1|/f_w < 1.2 \quad (1)$$

$$0.8 < f_2/f_w < 1.2 \quad (2)$$

$$0.3 < D_{12w}/f_w < 0.5 \quad (3)$$

$$BF_w/f_w > 1.5 \quad (4)$$

where a symbol $f_1$ designates a focal length of said first lens group, a symbol $f_2$ designates a focal length of said second lens group, a symbol $f_w$ designates a focal length of said zoom lens system at a minimum focal length state, a symbol $D_{12w}$ designates said gap between said first lens group and said second lens group at the minimum focal length state, and a symbol $BF_w$ designates a back focal length at the minimum focal length state.

2. The zoom lens system of claim 1, wherein said second lens group comprises, in order from said large conjugate side:

a first subgroup having a positive refracting power;

a second subgroup having a negative refracting power; and a third subgroup having a positive refracting power; and wherein said second lens group satisfies a following relational expression (5), $$1.3 < f_{21}/f_{23} < 1.7, \ f_{21} > 0 \text{ and } f_{23} > 0 \quad (5)$$

where a symbol $f_{21}$ designates a focal length of said first subgroup and a symbol $f_{23}$ designates a focal length of said third subgroup.

3. The zoom lens system of claim 1, wherein said second lens group comprises, in order from said large conjugate side:

a first subgroup having a positive refracting power;

a second subgroup having a negative refracting power and being composed of a lens having biconcave surfaces; and a third subgroup having a positive refracting power; and wherein said second lens group satisfies following relational expressions (6) and (7), $$0.4 < |f_{22}|/f_2 < 0.7 \quad (6)$$

$$0.2 < (r_{n2}+r_{n1})/(r_{n2}-r_{n1}) < 0.75 \quad (7)$$

where a symbol $f_{22}$ designates a focal length of said biconcave negative lens of said second subgroup, a symbol $r_{n1}$ designates a radius of curvature of the large conjugate side surface of said biconcave negative lens of said second subgroup, and a symbol $r_{n2}$ designates a radius of curvature of a small conjugate side surface of said biconcave negative lens of said second subgroup.

4. The zoom lens system of claim 1, wherein said second lens group comprises, in order from the large conjugate side:

a first subgroup having a positive refracting power;

a second subgroup having a negative refracting power; and a third subgroup having a positive refracting power; said zoom lens system further comprising an aperture stop disposed between said first subgroup and said second subgroup, a diameter of said aperture stop being variable.

5. The zoom lens system of claim 1, wherein said first lens group comprises, in order from said large conjugate side:

a negative meniscus first lens which is convex on said large conjugate side;

a biconcave negative second lens; and a positive third lens.

6. The zoom lens system of claim 5, wherein said second lens group comprises, in order from said large conjugate side:

a first subgroup having a positive refracting power;

a second subgroup having a negative refracting power; and a third subgroup having a positive refracting power;

said first subgroup comprising, in order from the large conjugate side, a positive fourth lens and a positive meniscus fifth lens which is convex on the large conjugate side.

7. The zoom lens system of claim 5, wherein said first lens of said first lens group is composed of two negative meniscus lens elements, both of which are convex on the large conjugate side.

8. The zoom lens system of claim 7, wherein said second lens group comprises, in order from the large conjugate side:

a first subgroup having a positive refracting power;

a second subgroup having a negative refracting power; and a third subgroup having a positive refracting power;

said first subgroup comprising, in order from the large conjugate side, a positive fourth lens and a positive meniscus fifth lens which Is convex on the large conjugate side.

9. The zoom lens system of claim 1, wherein said first lens group comprises a plurality of negative lenses and a single positive lens, and satisfies following relational expressions (8) and (9), $$v_{p1} < 32 \quad (8)$$

$$v_{n1} > 40 \tag{9}$$

where a symbol $v_{p1}$ designates Abbe number of glass material constituting the positive lens of said first lens group and a symbol $v_{n1}$ designates an average of Abbe numbers of glass materials constituting the negative lenses within said first lens group.

10. A projection-type display apparatus comprising:

a light source;

a color separating means for separating light emitted by said light source into light of three primary colors red, green and blue;

three image-display means for forming a monochromatic image and being illuminated by said three primary color light;

a color synthesizing means for synthesizing said light of three primary colors; and a zoom lens means for magnifying and projecting said light from said color synthesizing means;

said zoom lens means comprising, in order from a large conjugate side:

a first lens group having a negative refracting power; and a second lens group having a positive refracting power;

a focal length of said zoom lens system being longer, as a gap between said first lens group and said second lens group is reduced;

wherein said zoom lens system satisfies following relational expressions (1) to (4), $$0.9 < |f_1|/f_w < 1.2 \tag{1}$$

$$0.8 < f_2/f_w < 1.2 \tag{2}$$

$$0.3 < D_{12w}/f_w < 0.5 \tag{3}$$

$$BF_w/f_w > 1.5 \tag{4}$$

where a symbol $f_1$ designates a focal length of said first lens group, a symbol $f_2$ designates a focal length of said second lens group, a symbol $f_w$ designates a focal length of said zoom lens system at a minimum focal length state, a symbol $D_{12w}$ designates said gap between said first lens group and said second lens group at the minimum focal length state, and $BF_w$ designates a back focal length at the minimum focal length state.

11. The projection-type display apparatus of claim 10, wherein said second lens group of said zoom lens means comprises, in order from the large conjugate side:

a first subgroup having a positive refracting power;

a second subgroup having a negative refracting power; and a third subgroup having a positive refracting power; and wherein said second lens group satisfies a following relational expression (5), $$1.3 < f_{21}/f_{23} < 1.7 \; (f_{21} > 0 \text{ and } f_{23} > 0) \tag{5}$$

where a symbol $f_{21}$ designates a focal length of said first subgroup and a symbol $f_{23}$ designates a focal length of said third subgroup.

12. The projection-type display apparatus of claim 10, wherein said second lens group of said zoom lens means comprises, in order from the large conjugate side:

a first subgroup having a positive refracting power;

a second subgroup having a negative refracting power and being composed of a lens having biconcave surfaces: and a third subgroup having a positive refracting power; and wherein said second lens group satisfies following relational expressions (6) and (7), $$0.4 < |f_{22}|/f_2 < 0.7 \tag{6}$$

$$0.2 < (r_{n2} + r_{n1})/(r_{n2} - r_{n1}) < 0.75 \tag{7}$$

where a symbol $f_{22}$ designates a focal length of said biconcave negative lens of said second subgroup, a symbol $r_{n1}$ designates a radius of curvature of the large conjugate side surface of said biconcave negative lens of said second subgroup, and a symbol $r_{n2}$ designates a radius of curvature of a small conjugate side surface of said biconcave negative lens of said second subgroup.

13. The projection-type display apparatus of claim 10, wherein said second lens group of said zoom lens means comprises, in order from the large conjugate side:

a first subgroup having a positive refracting power;

a second subgroup having a negative refracting power; and a third subgroup having a positive refracting power; said zoom lens means further comprising an aperture stop disposed between said first subgroup and said second subgroup, a diameter of said aperture stop being variable.

14. The projection-type display apparatus of claim 10, wherein said first lens group of said zoom lens means comprises, in order from the large conjugate side:

a negative meniscus first lens which is convex on the large conjugate side;

a biconcave negative second lens; and a positive third lens.

15. The projection-type display apparatus of claim 14, wherein said second lens group of said zoom lens means comprises, in order from the large conjugate side:

a first subgroup having a positive refracting power;

a second subgroup having a negative refracting power; and a third subgroup having a positive refracting power;

said first subgroup comprising, in order from the large conjugate side, a positive fourth lens and a positive meniscus fifth lens which is convex on the large conjugate side.

16. The projection-type display apparatus of claim 14, wherein said first lens of said first lens group of said zoom lens means is composed of two negative meniscus lens elements, both of which are convex on the large conjugate side.

17. The projection-type display apparatus of claim 16, wherein said second lens group of said zoom lens means comprises, in order from the large conjugate side:

a first subgroup having a positive refracting power;

a second subgroup having a negative refracting power; and a third subgroup having a positive refracting power;

said first subgroup comprising, in order from the large conjugate side, a positive fourth lens and a positive meniscus fifth lens which is convex on the large conjugate side.

18. The projection-type display apparatus of claim 10, wherein said first lens group of said zoom lens means comprises a plurality of negative lenses and a single positive lens, and satisfies following relational expressions (8) and (9), $$v_{p1} < 32 \quad (8)$$

$$v_{n1} > 40 \quad (9)$$

where a symbol $v_{p1}$ designates Abbe number of glass material constituting the positive lens of said first lens group and a symbol $v_{n1}$ designates an average of Abbe numbers of glass materials constituting the negative lenses within said first lens group.

19. The projection-type display apparatus of claim 10, wherein said three image-display means are scattering-mode liquid-crystal panels which can vary scattering state of light electrically.

* * * * *